Sept. 16, 1941.　　　　K. H. MacKAY　　　　2,256,264
ROTARY FLUID PRESSURE APPARATUS
Filed July 22, 1938　　　14 Sheets-Sheet 1

Inventor
Kenneth H. MacKay
by Roberts, Cushman & Woodberry
Att'ys.

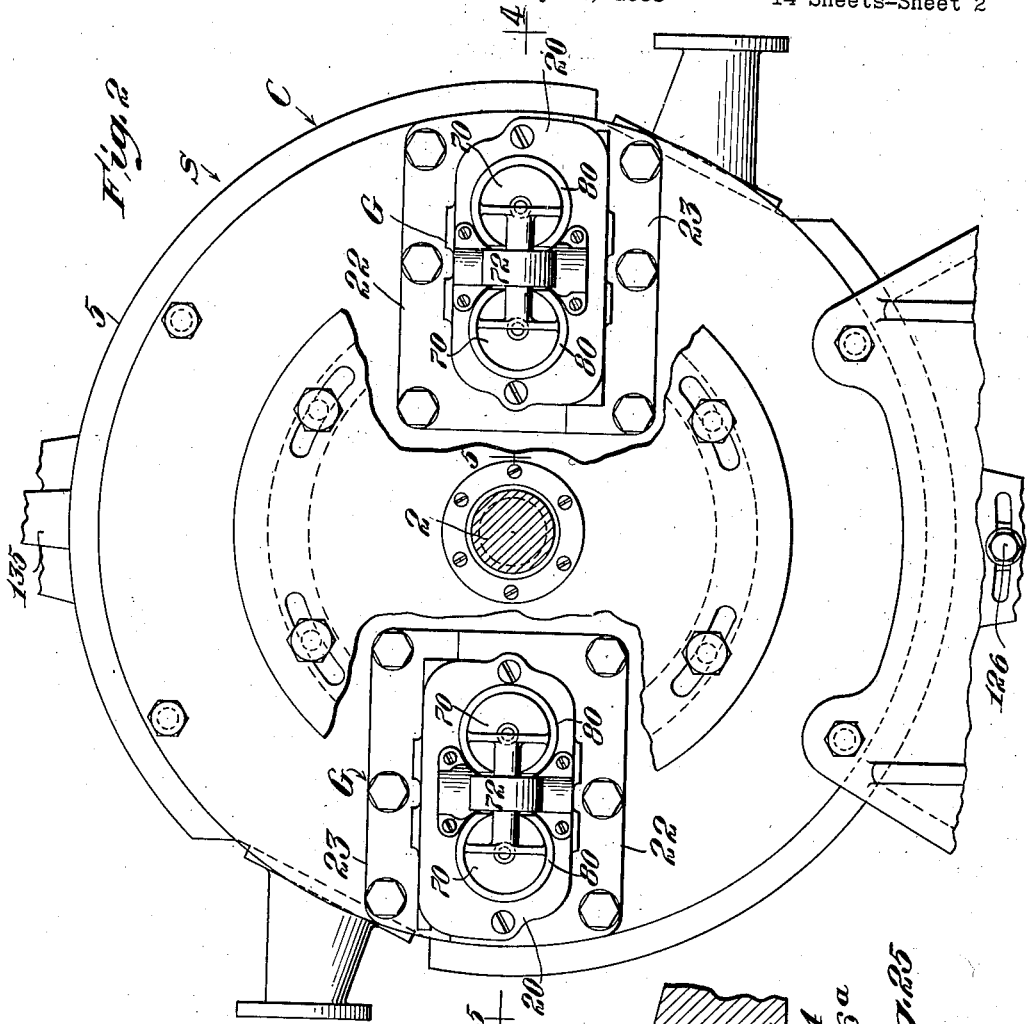
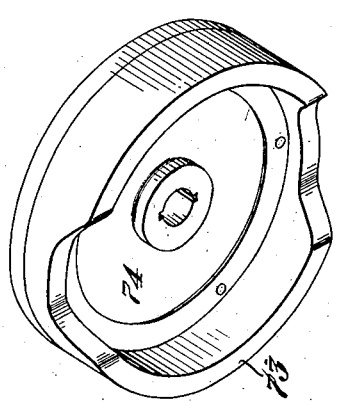
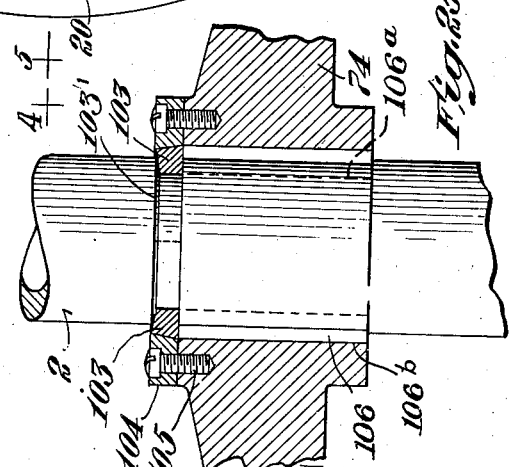

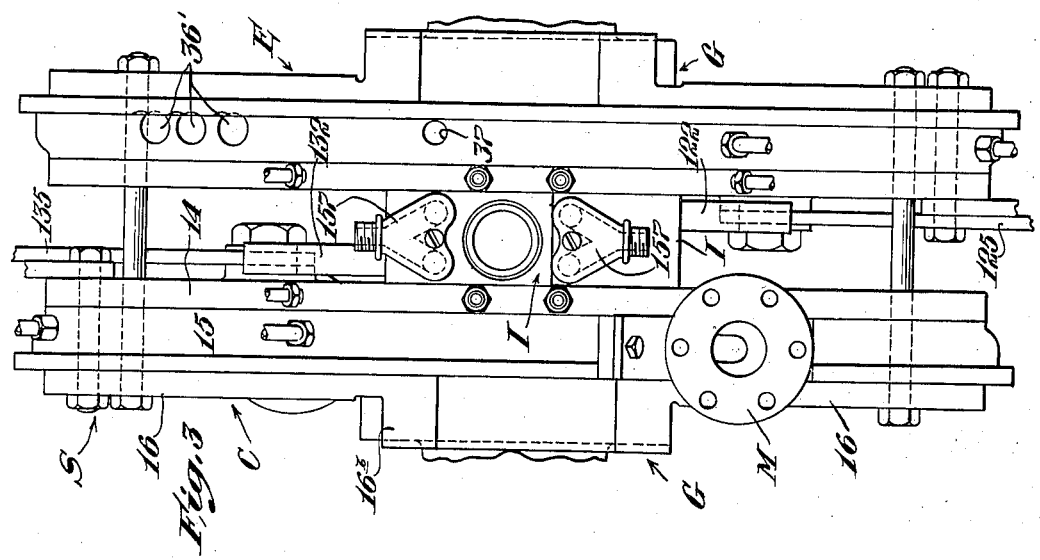
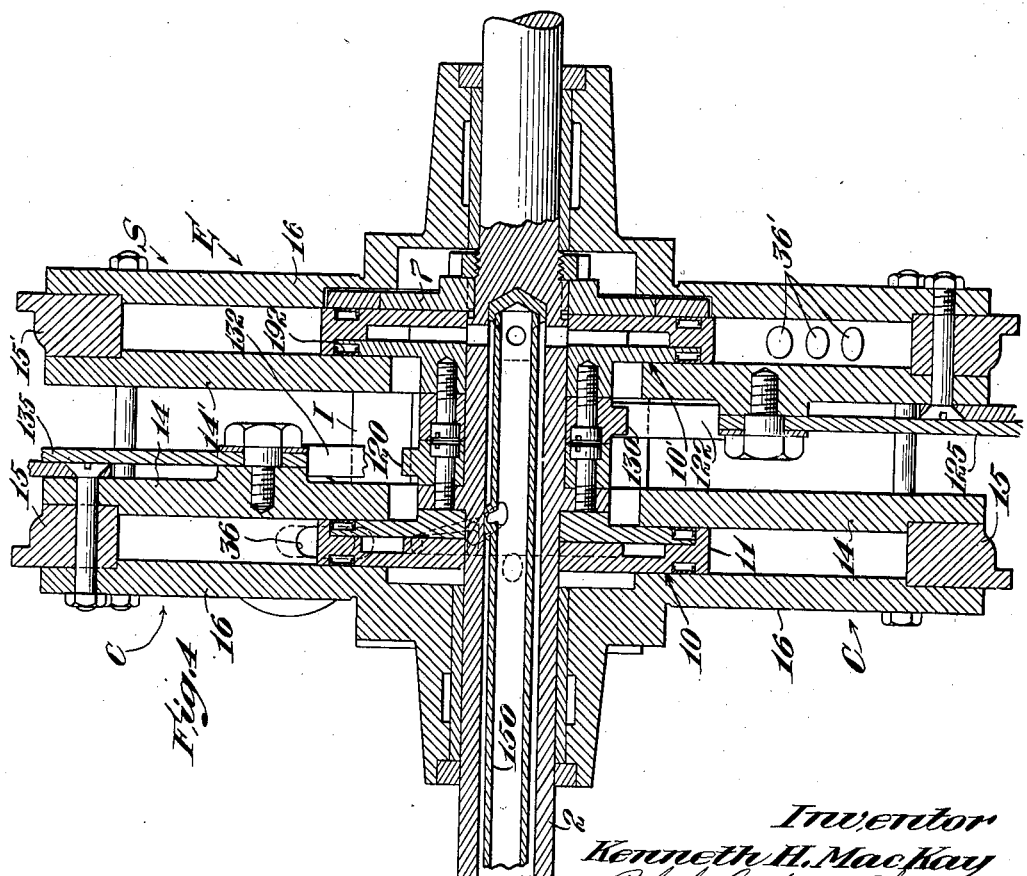

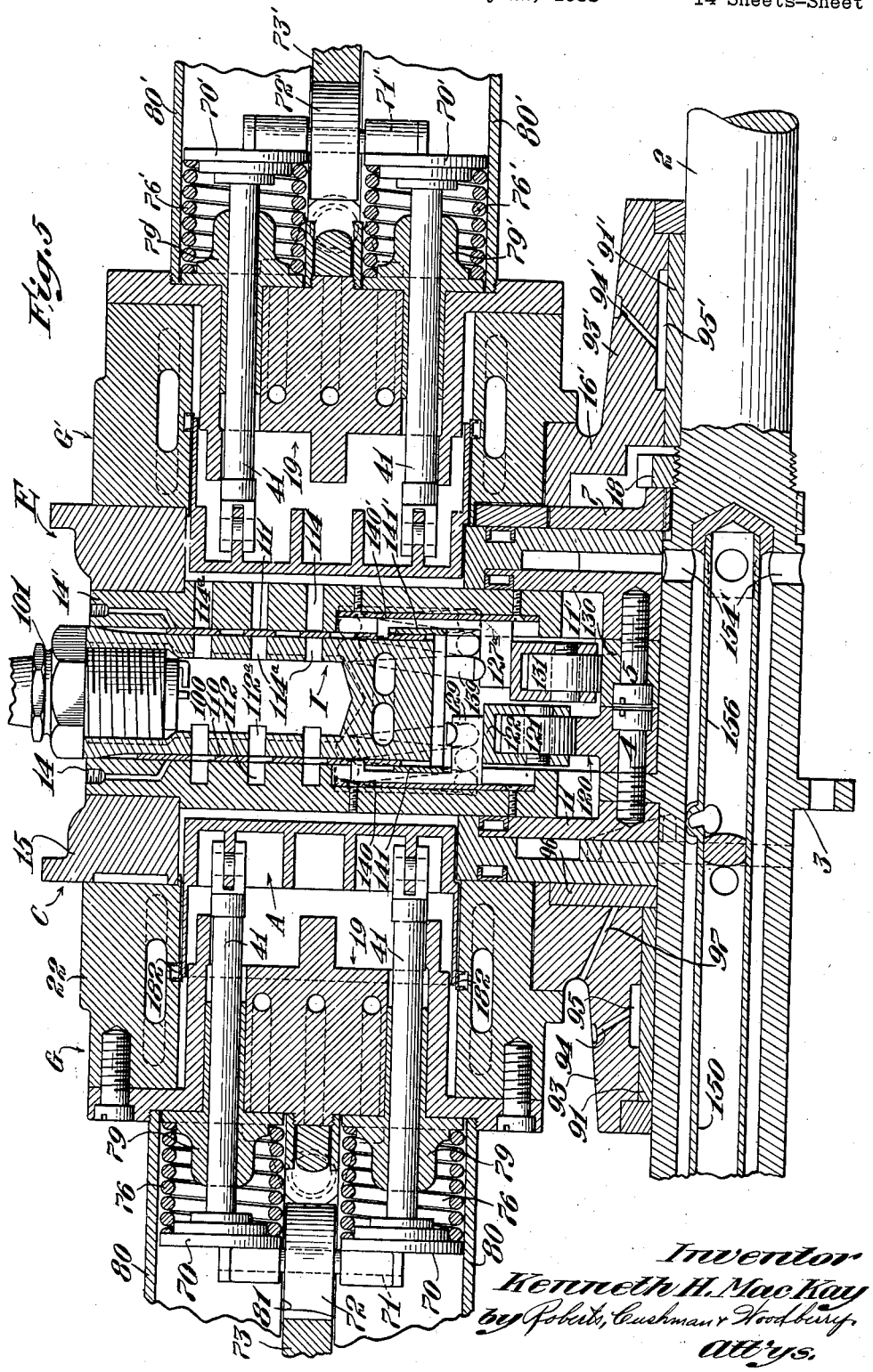

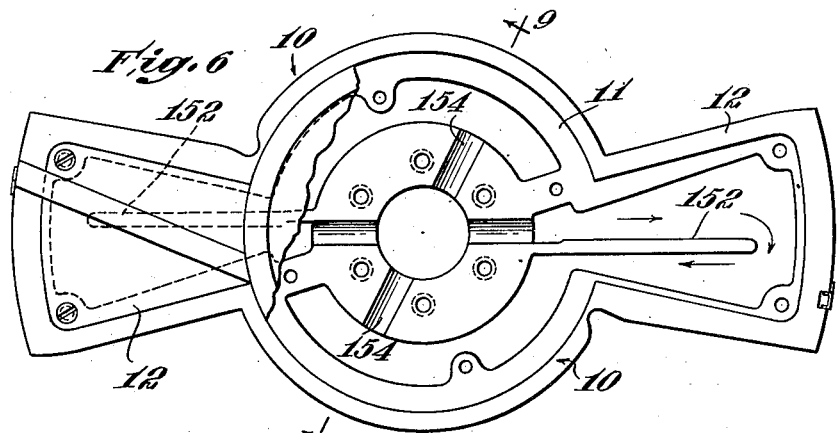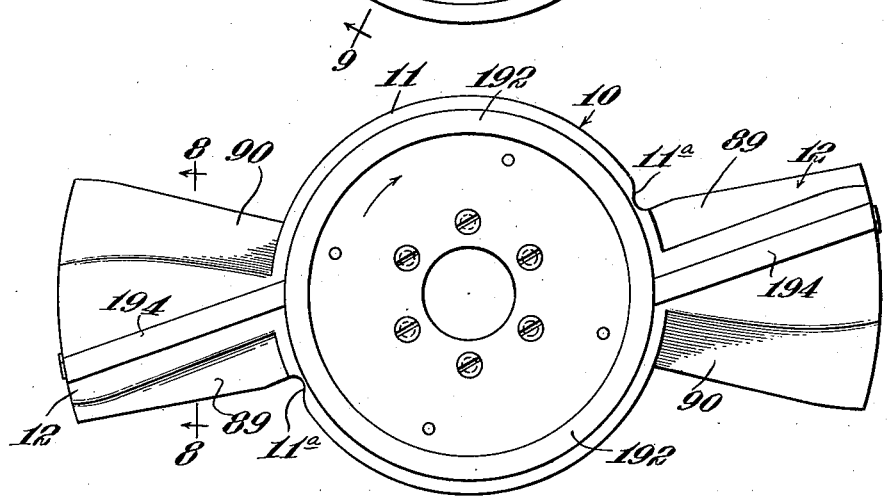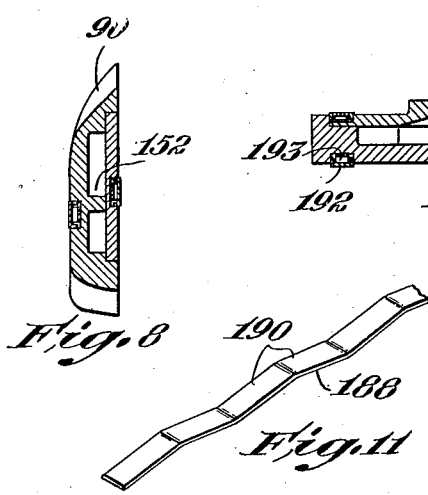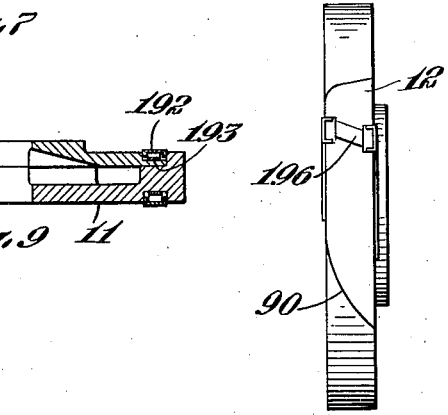

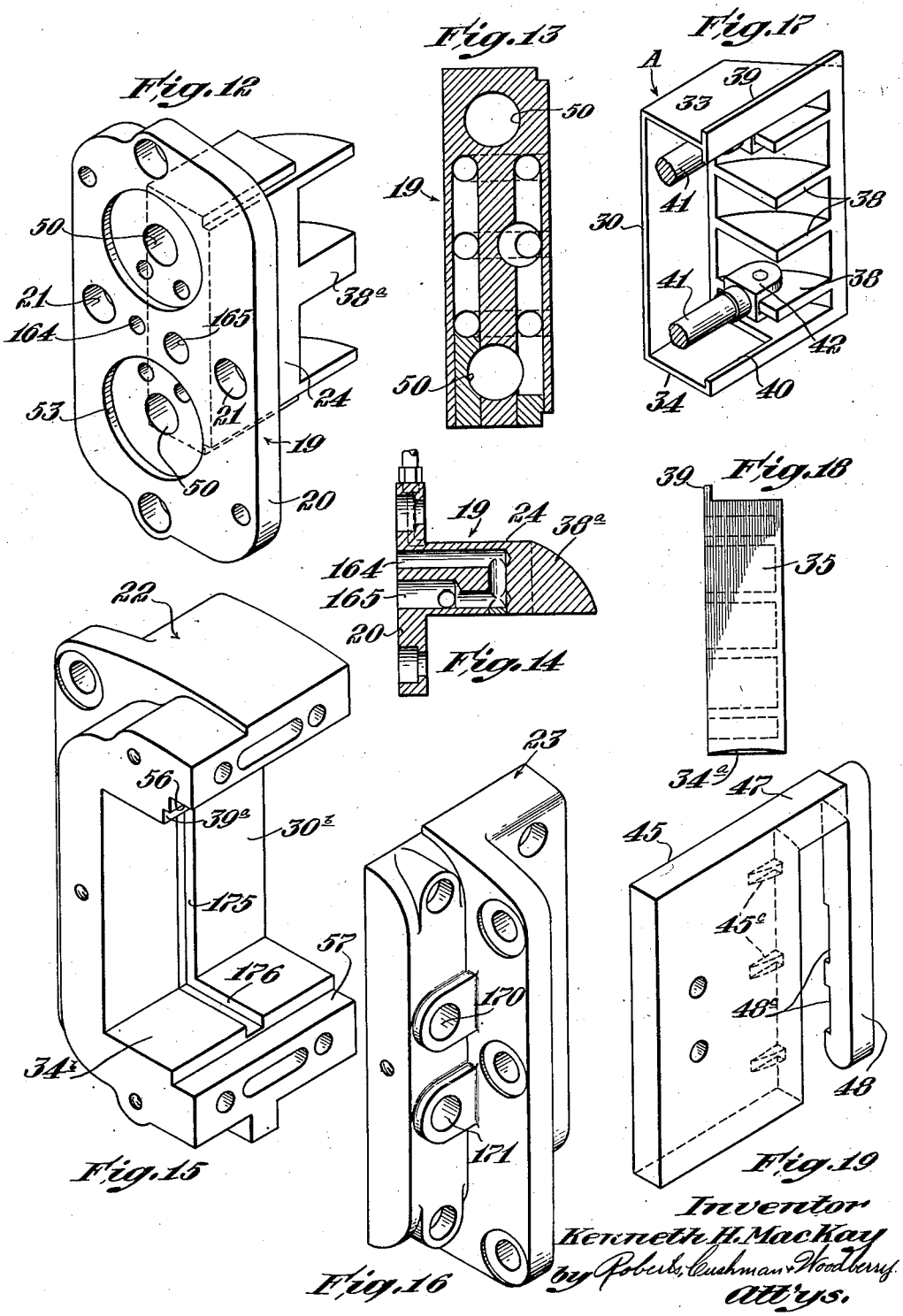

Sept. 16, 1941.  K. H. MacKAY  2,256,264
ROTARY FLUID PRESSURE APPARATUS
Filed July 22, 1938  14 Sheets-Sheet 7
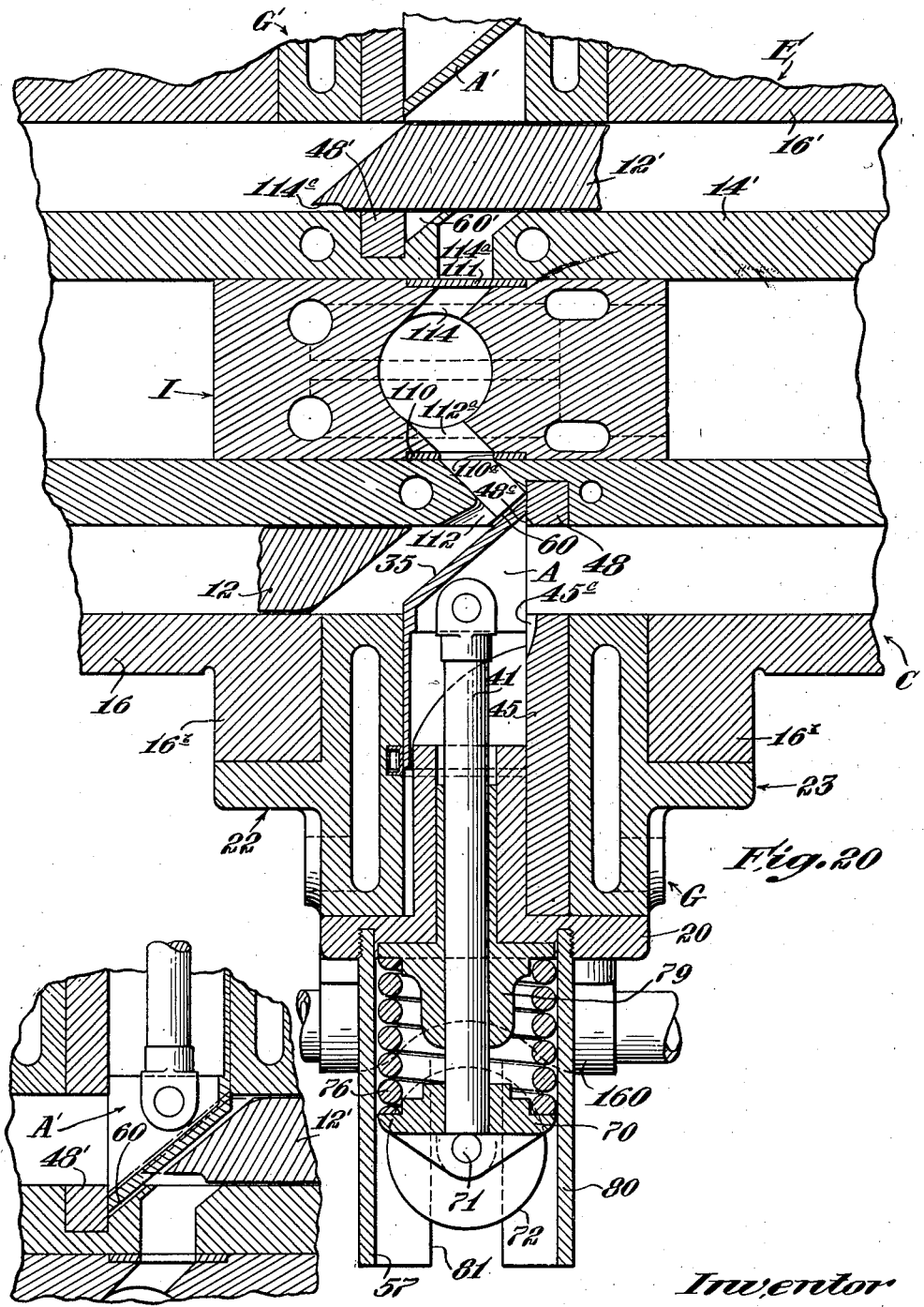

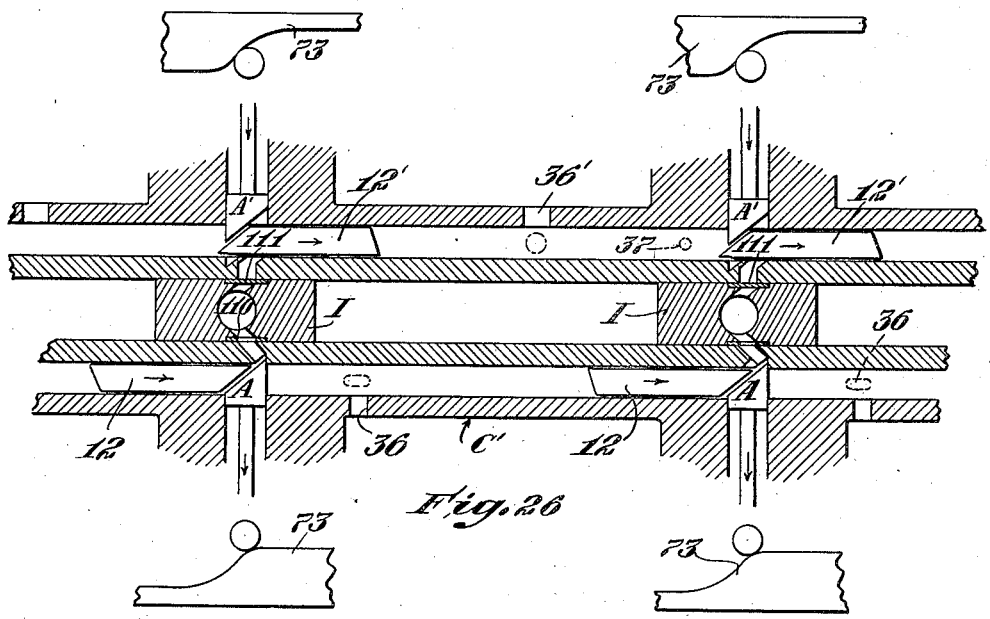
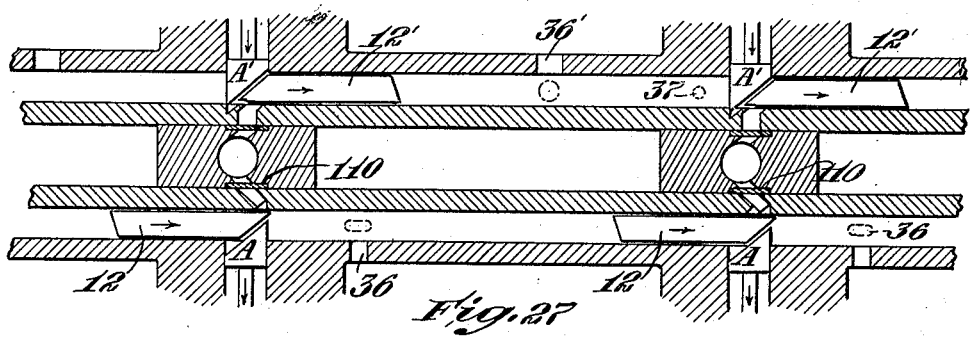
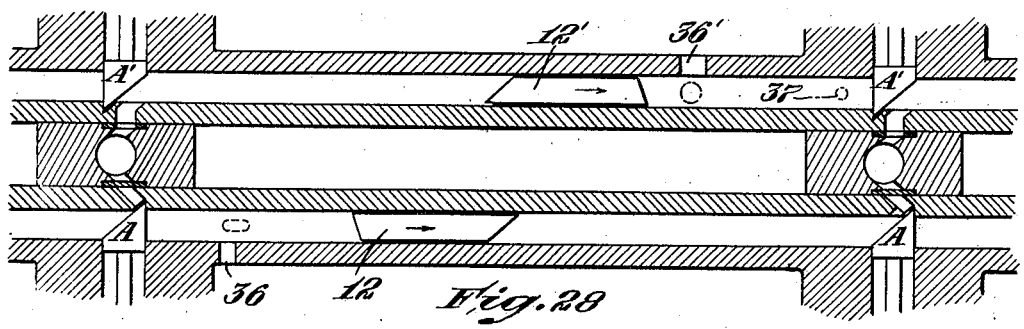

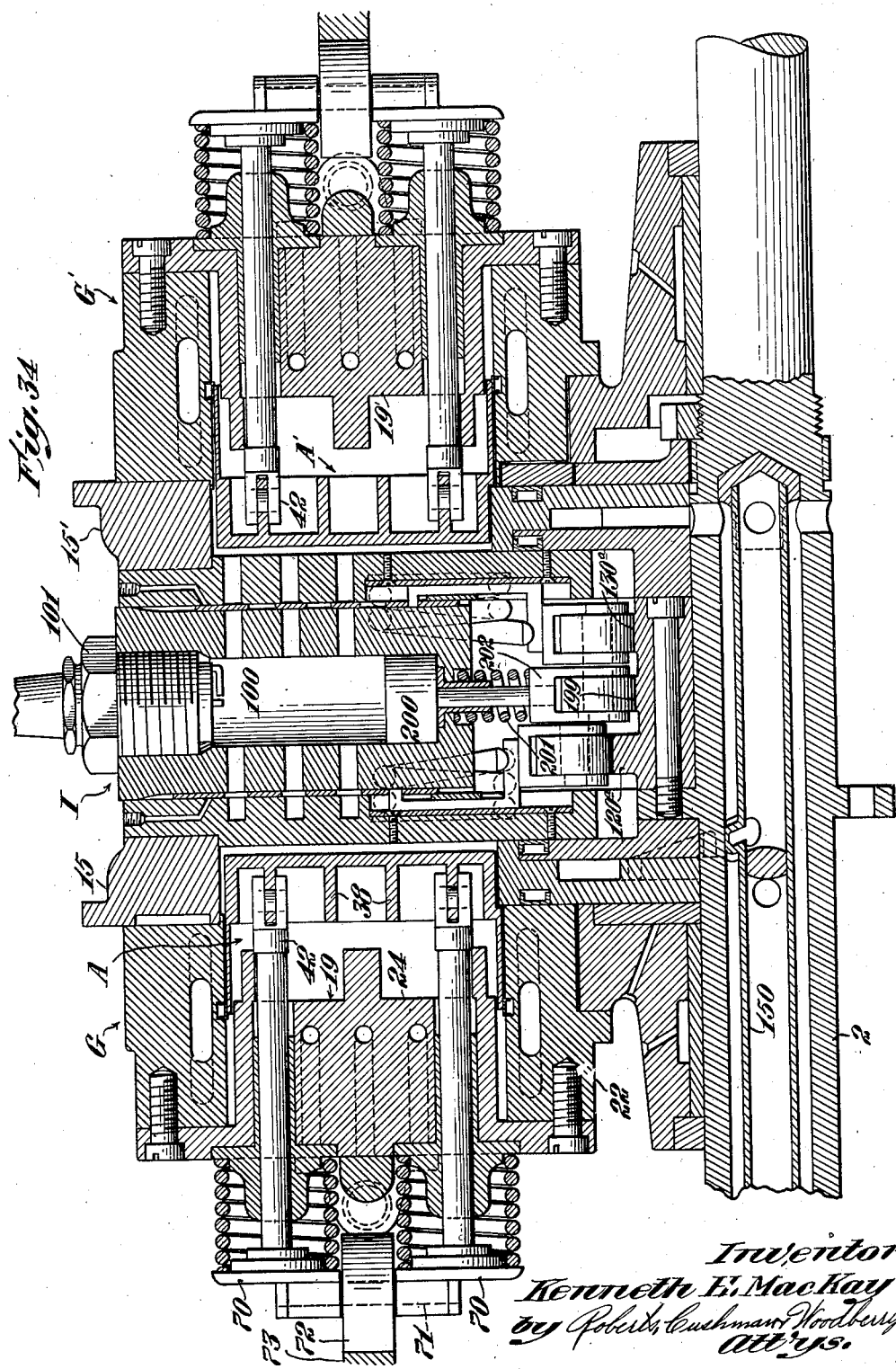

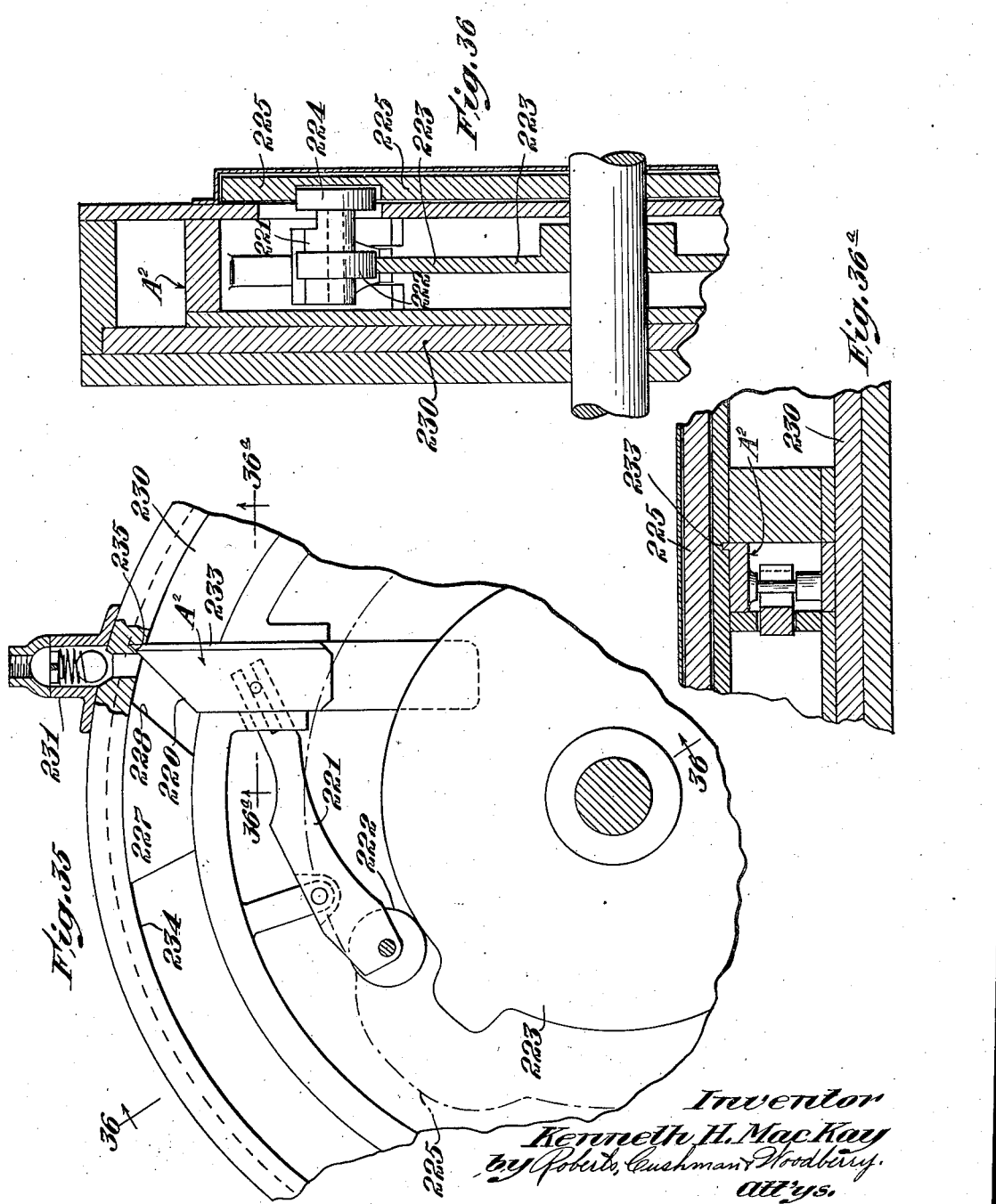

Sept. 16, 1941.  K. H. MacKAY  2,256,264
ROTARY FLUID PRESSURE APPARATUS
Filed July 22, 1938   14 Sheets-Sheet 13

Inventor
Kenneth H. MacKay
by Roberts, Cushman & Woodberry
Att'ys.

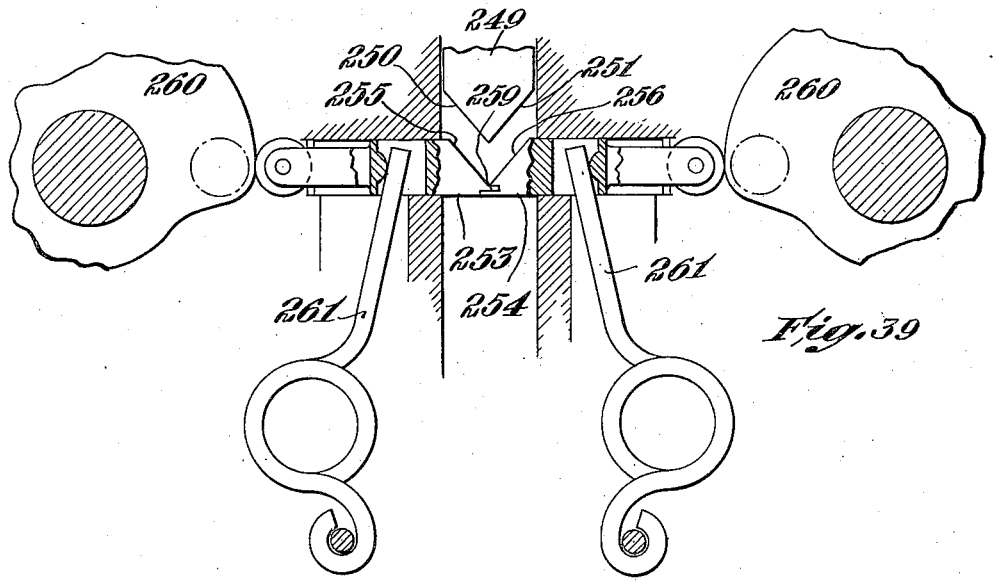
Fig. 39
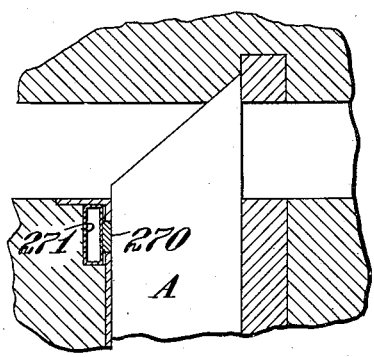
Fig. 40
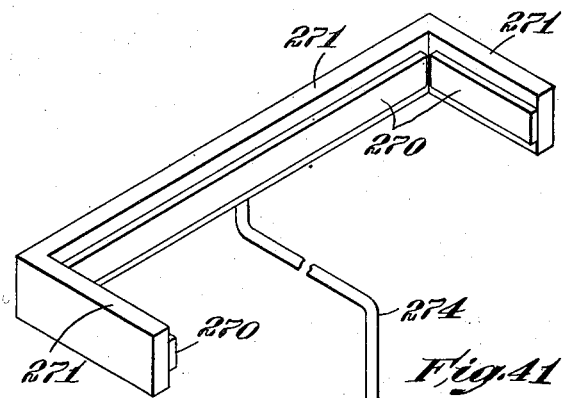
Fig. 41
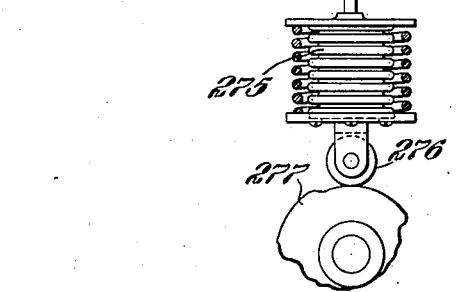
Inventor
Kenneth H. MacKay
by Roberts, Cushman & Woodbury
Attys.

Patented Sept. 16, 1941

2,256,264

UNITED STATES PATENT OFFICE 2,256,264

ROTARY FLUID PRESSURE APPARATUS

Kenneth H. MacKay, Ocala, Fla.

Application July 22, 1938, Serial No. 220,689

26 Claims. (Cl. 123—14)

This invention relates to fluid pressure apparatus of the rotary type wherein fluid-containing pockets contract and/or expand, and, in certain aspects, the present invention affords an internal combustion engine wherein the gaseous charge is both compressed and expanded. More particularly, the present invention affords apparatus of this type having an abutment moving into and out of an annular passage containing a rotary vane.

Heretofore rotary engines have possessed certain inherent advantages due to the uniform speed of their rotary vanes or pistons, but they have lacked certain important advantages provided by conventional reciprocating engines, wherein the speed of each piston varies throughout its stroke. My engine retains the advantages of earlier rotary engines, while also presenting desirable characteristics heretofore lacking in such engines. Thus, this invention permits unusually efficient compression, combustion, and expansion of the gaseous charge.

Combustion takes place advantageously in the conventional reciprocating motor, since the piston is then near its top dead center position, and rapid flame spread may occur while the gases remain compacted under conditions of substantially constant volume and well before the piston starts moving rapidly. However, at the instant of maximum pressure, the piston is still moving rather slowly, although at a gradually increasing speed, so that there are unnecessary heat losses through the combustion chamber walls during this part of the stroke, while the angularity of the connecting rod and crank do not permit the most efficient transfer of power to the crank shaft. On the other hand, rotary motors have heretofore been characterized by vanes moving rapidly away from abutments, so that the advantages of rapid flame speed in a compacted gas charge were not realized. Accordingly, combustion took place under much less advantageous conditions and with much less certainty than in the reciprocating engine, although after the obtainable maximum pressure had been reached, the high speed of the rotary piston was, by itself, advantageous.

The present invention permits the combustion of the charge under conditions of substantially constant volume, such as have heretofore characterized the reciprocating engine, while as soon as the maximum gaseous pressure has been reached, the rotary piston may move rapidly away from the abutment so that an efficient transfer of power to the power shaft is obtained and heat losses are minimized. To permit these desirable results, I provide an abutment which is positively accelerated to move quickly across the path of the rotary piston or vane, and I arrange the annular passage for the vane so that the path of movement of the abutment may be relatively short. Also the reciprocating or oscillating abutment itself should be as light in weight as structurally feasible, so that the inertia forces due to acceleration and deceleration will be kept within satisfactory limits even at a relatively engine high speed. In order to aid the movement of the abutment, and particularly its deceleration as it reaches sealing position (or its acceleration away from such position at the compression side of the engine), the abutment is so shaped that the pressure of the gaseous charge may tend to move it away from its extreme innermost or sealing position.

One important feature of this invention involves the arrangement of the abutment and vane so that these parts have cooperating surfaces in close proximity while the abutment is in sealing position but is in motion, for example is decelerating as it approaches its extreme position while the pocketed charge is burning, or is accelerating away from such a position while the charge is being compressed. To permit these desirable results, the advance end of the abutment preferably passes into sealing contact with a suitable surface of a recess in the wall of the annular chamber before the abutment reaches its extreme position, while cooperating surfaces of the abutment and vane are preferably both beveled or inclined relative to radial planes extending from the axis of the rotor and intersecting these surfaces. Such an arrangement permits the abutment to extend across the chamber while a substantial portion of the vane is still passing a part of the abutment, i. e., is disposed in the same radial plane. Under such conditions, therefore, the surfaces of the abutment and of the vane remain in close generally parallel relation to define a restricted pocket having a substantially constant volume for the gaseous charge for an appreciable fraction of the cycle, while thereafter the surface of the vane may move rapidly away from the cooperating surface of the abutment. In order to assure the rapid acceleration of the abutment into the annular passage, suitable cam means preferably is provided.

Preferably the charge is initially ignited in a chamber which is outside of the annular passage. Thus, for example, two annular passages may be provided, compression of each charge being effected in one of said annular passages, the compressed charge then being admitted through a suitable inlet valve to the chamber where ignition takes place, and the charge then being admitted to the restricted pocket between the abutment and vane in the other annular chamber.

An important feature of the present invention involves the arrangement of the valve means and ports associated with the ignition chamber and of that chamber itself, so that the volumetric efficiency of the apparatus is relatively high and so that heat losses resulting from the passage of the charge into the ignition chamber and out of the same are minimized. To permit these desirable results, and also to aid gas turbulence and proper combustion, the charge preferably passes into and out of the ignition chamber in more or less tangential directions, the ports or passages connecting the chamber and the restricted pockets in the annular passages at either side of the chamber relatively short and of ample area to permit free flow of the gases.

With an engine of this character the pressure and time at which combustion takes place may be accurately controlled, and extremely high pressures may be employed, if desired. Such pressures may be substantially above those which would cause detonation in a conventional reciprocating engine, but in an engine of this type, pressures of this order may be employed materially to enhance operating efficiency.

Further advantages of the present invention involve the avoidance of objectionable inertia forces and consequent high stressing of materials and consequent objectionable vibration and wear; the provision of adequate cooling; the avoidance of excessive noise; the maintenance of effective sealing of the gaseous charge by the relatively moving parts; the provision of apparatus which may be manufactured at a reasonable cost and in which accessibility and replaceability of parts is an important advantage; and the minimization of longitudinal and lateral thrusts and unbalanced forces upon the rotor and stator, respectively.

In the accompanying drawings:

Fig. 2 is an end elevation of the major portion of the machine, parts being broken away;

Fig. 3 is a partial top plan view of the assembly shown in Fig. 2;

Fig. 4 is a section on line 4—4 of Fig. 2, certain parts being omitted;

Fig. 5 is a section on line 5—5 of Fig. 2 on an enlarged scale;

Fig. 6 is a side view of one of the rotor members shown partially broken away;

Fig. 7 is a similar view of the opposite side of the same;

Fig. 8 is a section on line 8—8 of Fig. 7;

Fig. 9 is a section on line 9—9 of Fig. 6;

Fig. 10 is an edge elevation of the rotor;

Fig. 11 is an isometric view of an element employed with a sealing strip of the rotor;

Fig. 12 is an isometric view of an inner guide member for an abutment;

Figs. 13 and 14 are respectively vertical and horizontal sections of the same;

Figs. 15 and 16 are isometric views of parts of the outer jacket and guiding assembly for the abutment member;

Fig. 17 is an isometric view of the abutment;

Fig. 18 is an end elevation of the same;

Fig. 19 is an isometric view of a guide plate employed with the abutment;

Fig. 20 is a section of a portion of the apparatus including the combustion chamber and related parts;

Fig. 21 is a sectional view of a portion of the assembly shown in Fig. 20, with the parts in another relative position;

Fig. 24 is an isometric view of a cam member for actuating the abutments at the compression side of the motor;

Fig. 25 is a sectional view showing the manner in which such a cam member is connected to the main shaft of the motor;

Figs. 26 to 29 are diagrammatic views showing the operating relationship of the parts during various portions of the cycle;

Fig. 34 is a sectional view similar to Fig. 5, but showing an optional form of the invention;

Fig. 35 is a sectional detail of an optional embodiment of the invention as embodied in a compressor;

Fig. 36 is a section indicated by line 36—36 of Fig. 35;

Fig. 36a is a section on line 36a—36a of Fig. 35;

Figs. 38 and 39 are sectional views diagrammatically showing other optional forms of abutment assemblies;

Fig. 40 is a sectional detail showing an optional sealing arrangement for the abutment; and Fig. 41 is a diagrammatic view showing portions of such a sealing arrangement.

My invention may be employed in a pump wherein fluid containing chambers expand or contract, but the principles of my invention in the preferred embodiment are best understood with reference to a motor having a compression side wherein the fluid pockets contract to compress the gaseous charge and an expansion side wherein fluid pockets expand. In general, machines of this type belong to the class wherein one of the relatively movable members may be in the form of a rotor and wherein the other cooperating members may be in the form of a stator, it being understood that either member may be rotated while the other member is stationary or, in fact, that both may be rotated as long as relative rotation occurs between the two.

GENERAL ARRANGEMENT

Figure 1:
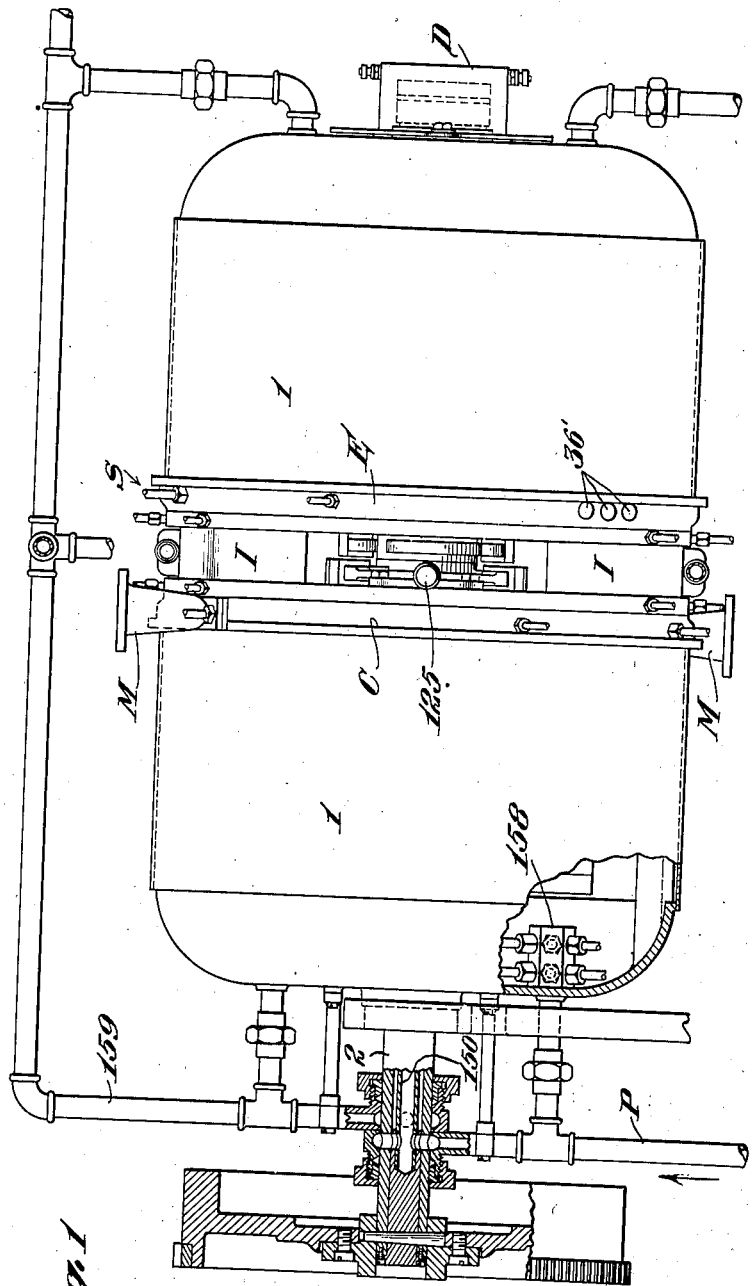
Fig. 1 is a plan view of an engine embodying the principles of this invention, parts being broken away and shown in section.

Fig. 1 is a front elevational view of a motor assembly in which the principles of the present invention are embodied. Such a motor assembly includes outer casings 1 and suitable auxiliary components such as a carburetor and a distributor D. Between the casings 1 is located a stator assembly S (Figs. 2, 3 and 4) which comprises a compression portion C and an expansion portion E. These portions may be generally similar to each other and have similar parts which are identified by corresponding reference characters. These portions may be spaced by ignition chambers I, there being, for example, two diametrically opposed chambers I in the illustrated embodiment.

First referring in some detail to the compression portion C, and particularly to Figs. 4 and 5, it will be noted that this portion has an inner annular wall 14 and an outer wall 16, which are secured to a peripheral ring 15. A shaft 2 forms part of the rotor member and extends through both of the stator portions C and E. The shaft 2 carries a vane member 10 disposed in the compression portion of the stator and a similar vane member 10' disposed in the expansion portion of the stator.

The vane member 10 is shown more particularly in Figs. 6 to 10 and comprises a cylindrical hub portion 11 with similar, oppositely disposed vanes 12. The hub portion 11 cooperates with the side walls 14 and 16 and the peripheral ring 15 of the compression portion C in defining an annular chamber in which the vanes 12 rotate, the sides of the vanes moving in sealing contact with the inner surfaces of the side walls 16 and 14 of the chamber and the outer ends of the vanes moving in similar contact with the inner surface of the ring 15.

The compression portion is provided with abutment guiding asemblies G adjoining the ignition chambers I (Figs. 2 and 3) which provide guide portions engaging both inner and outer surfaces of movable abutments A (Fig. 5), which have portions movable through openings in wall 16 and across the annular chamber in which vanes 12 rotate.

Fig. 12 illustrates the inner guide 19 for an abutment A, this guide comprising an outer plate portion 20 and an inner guide block 24. The plate portion is provided with suitable openings 21 to receive fastening elements securing the plate to the outer guide for the abutment, which comprises the castings 22 and 23 (Figs. 2, 15 and 16). The members 22 and 23 are arranged to afford an open-ended box-like assembly having planar inner surfaces engaging corresponding surfaces of the abutment member A. This member, in the position shown in Figs. 17 and 18, has a planar side wall 30 and upper and lower walls 33 and 34, the end wall 35 of the abutment being inclined relative to the side wall 30. The edge of the upper wall 33 may be provided with a reinforcing flange 39 which extends both inwardly and outwardly from that wall, while the inner part of the lower wall 34 is provided with an inwardly directed flange 40. The triangular portion of the lower end of the abutment (in the position shown in Fig. 18) is provided with a concavely curved surface 34$^a$, the curvature of this surface conforming to the curvature of the hub portion 11 of the vane member 10.

The upper part of jacket member 22 is provided with a rabbet 39$^a$ to engage the flange 39 of the abutment member, it being understood that the lower inner surface 34$^b$ of the member 22 engages the outer planar surface of the lower wall 34 of the abutment member and that the vertical inner wall 30$^b$ of the jacket member 22 engages the outer surface of the vertical wall 30 of the abutment, while the upper inner surface of the member 22 engages wall 33 of the abutment. It is evident that the guide member 19 provides an inner portion 24 with surfaces to engage the inner surfaces of the vertical wall 30 and of the upper and lower walls 33 and 34 of the abutment.

In practice, I prefer to provide a guide plate 45 (Fig. 19) which engages the outer surfaces of the flanges 39 and 40 of the abutment member. This guide plate 45 has a rectangular body portion which is clamped between the jacket members 22 and 23, the jacket member 22 having rabbeted portions 56 and 57 to receive the upper and lower edges of this portion of the guide plate 45. The latter has an extension 47 which is received in a recess 47$^a$ in the peripheral ring 15 of the stator assembly (Fig. 22) and has a guide rod 48 which is received in a suitable recess 48$^a$ in the inner wall 14 of the stator assembly.

It is thus evident that the plate 45 has a portion straddling the annular chamber in which the vanes 12 rotate, the extension 47 of the plate affording a continuous guide for the outer surface of the upper flange 39 of abutment A. The ring 15 is provided with a rabbeted portion 39$^b$ at one side of the groove 47$^a$ to receive the end of this flange when the abutment is in its advanced position. The hub portion 11 of the vane member may be cut away, as designated by reference characters 11$^a$ (Fig. 7) to permit the guide rod 48 to be moved into its normal position in the recess 48$^a$ of wall member 14. This inner wall 14 is also provided with a recessed portion 60 adjoining the recess 48$^a$, which is shaped to receive the beveled, advance end of the abutment A (Fig. 20).

The triangular portion of the abutment may be provided with a plurality of substantially triangular reinforcing flanges 38 (Fig. 17). The intermediate flanges 38 slide on the part 38$^a$ of guide 19, while the other flanges 38 have pin connections with the forked ends 42 of actuating rods 41 which extend through bores 50 in the inner guide 19. The outer ends of these rods 41 carry cap members 70 connected by a pin 71, shown in dotted lines in Fig. 5, on which a follower roll 72 is mounted, this roll being engageable with a cam 73 afforded by the irregularly shaped annular flange on a cam disk 74 (Fig. 24) secured to shaft 2.

Fig. 25 illustrates the manner in which the cam disk 74 may conveniently be secured on the shaft 2. For this purpose the shaft may be provided with a groove 103' and with suitable keyways 106$^a$ to engage longitudinal keys 106 which also engage corresponding grooves 106$^b$ in the hub portion of the disk. The groove 103' receives the two halves of a split ring 103 which has an outer beveled surface. A collar 104 is secured by screws 105 to the hub of the disk 74 and provides an internal beveled surface effective to press the halves of the split ring inwardly thus to anchor the cam disk against movement longitudinally of the shaft.

Relatively heavy compression springs 76 are disposed about the outer ends of the rods 41 and tend to urge the cap members 70, the rods 41 and the abutment A outwardly against the action of the cam 73. The inner ends of the springs engage flanges on bushing members 79 which extend into the bores 50 in member 19 to afford guides for the rods 41. Tubular guide sleeves 80 are disposed about the springs 76 having broken-away portions 81 to afford clearance for the roll 72 and pins 71 (Fig. 2).

Referring again to Figs. 7 and 10, it is evident that the vanes 12 are provided with beveled edges or surfaces 90 which are inclined relative to radial planes extending from the axis of rotation of the vane member. The inclination of this part of each vane 12 preferably closely corresponds to the inclination of the wall 35 of the abutment member A so that when the abutment member projects into the annular chamber with its advance end received in a recess 60, the beveled surfaces of the vane and the abutment member may be in generally parallel juxtaposition, as shown, for example, in Fig. 20.

It will be understood that the rotor 10 normally revolves in the direction indicated by the curved arrow in Fig. 7 so that the beveled surfaces 90 may be regarded as the advance surfaces of the vanes. The opposite edges of the vanes may be shaped to provide cut-away portions 89 which permit the quick return movement of the abutments into the annular chamber after the respective vanes have cleared the openings through which the abutments move, it being understood that such an arrangement is desirable since the inner ends of the vanes are moving more slowly than the outer portions thereof.

In practice, the cam 73 is arranged to hold each abutment A in its advanced position so that it projects across the corresponding annular chamber, as shown in the lower part of Fig. 20, except when the vane is passing the opening in the outer wall 16 of the chamber through which the abutment A moves. The cam is arranged so that the springs 76 are effective in withdrawing the abutment A from the chamber to permit each vane 11 to move through the corresponding portion of the chamber. The abutment actuating mechanism preferably is arranged so that, when an abutment is fully retracted, its inner end is spaced somewhat from the annular chamber, such a position of the beveled surface of the abutment A' on the expansion chamber E being shown in Fig. 20. This arrangement is particularly advantageous since initial acceleration of the abutment as it moves inwardly (or its final deceleration as it moves outwardly) can occur while the vane is passing the abutment. Thus the cam at the expansion side of the apparatus is causing the movement of the abutment at appreciable speed by the time the vane has started to clear the opening through which the abutment A' moves into the annular chamber. The abutment then moves rapidly with its advance end projecting into the annular chamber while the vane is still in the same general radial plane as the abutment. The rapid movement of the abutment can continue while it is moving across the chamber and into sealing position, and its final deceleration occurs while it is already in sealing position, i. e., while its end engages the bar 48' at the side of recess 60'. Accordingly, while the abutment is moving across the annular chamber to sealing position, it may have a relatively high average speed, so that its beveled surface may move in relatively close, generally parallel relation to a cooperating surface of the vane.

The same general relationship may be provided as the abutment A at the compression side of the machine moves away from its innermost position. During this movement initial acceleration can occur while the abutment is still in sealing position, i. e., still engages the guide rod 48, and final deceleration can occur after the abutment has moved out of the annular chamber and while the vane is passing the abutment. It is thus evident that I have devised arrangements permitting the generally parallel juxtaposition of the cooperating surfaces of the abutment and vane either when the abutment is moving outwardly to permit the vane to pass or when the abutment is moving inwardly directly after the vane has passed the opening through which the abutment moves.

It may be here noted that the bars 48 of the plates 45 are provided with notched corner portions as designated by reference character 48c (Figs. 19 and 20), thus, for example, to permit relieving of pressure at the compression side of the motor when the abutment is moving from its advance position and is subjected to pressure due to the oncoming vane 12. Thus the strain upon the extreme advance edge of the abutment and upon the adjoining corner of the bar 48 is relieved, preventing undue wear at these points. It may furthermore be noted that the adjoining corner of the plate 45 is provided with pressure relieving recesses 45c which aid in relieving the pressure behind the abutment A as it moves out of the annular chamber.

It will be evident from inspection of Fig. 4 that the annular chambers in which the vanes 12 and 12' rotate are relatively narrow in comparison to their radial extents. Thus the paths which the abutments must follow in crossing the chambers are relatively short. It is furthermore evident that the arrangement of the guiding and supporting members 19, 22 and 23 permits an abutment to be employed which is very light in weight, the structural arrangement of the flanged abutment with its open rear and side portion contributing toward this end. Accordingly, the inertia stresses due to acceleration and deceleration of an abutment may be kept within reasonable limits, despite the movement of the abutment at high speed so that its beveled surface may be closely juxtaposed to the cooperating surface of a rotor vane.

It will be understood that in practice the members 22 and 23 are provided with flanges which are bolted to integral boss-like extensions 16b of the plate 16 (see Fig. 20), while the flange 20 of the member 19 is secured to the ends of the jacket members 22 and 23, which in turn are connected to each other by suitable fastening bolts. The fastenings securing the members 22 and 23 to the wall of the stator may be removed, permitting the removal of the inner and outer abutment guides, the abutment A, the rods 41 and springs 76, etc. associated therewith, so that the entire abutment-guiding assembly G and the cooperating parts of the abutment may be removed as a unit from the stator assembly.

Figure 33:
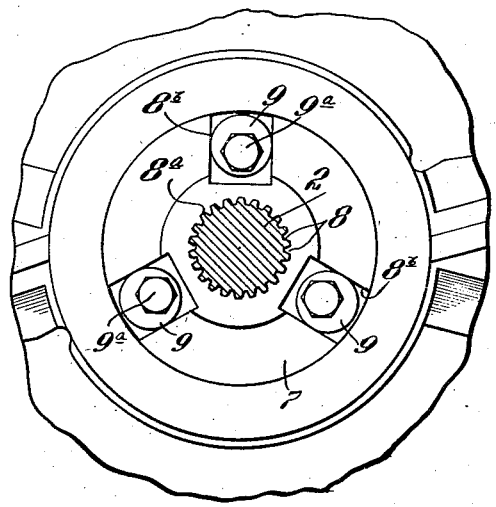
Fig. 33 is a sectional detail.

As shown in Fig. 5, it is evident that the hub portion 11 of the rotor and a cam 120 are secured to an integral flange 3 on the shaft 2 by fastening means such as cap screws 4. On the other hand, a cam 130 is secured to the hub 11' of rotor 10' by cap screws 5 before these parts are assembled on the shaft. The rotor 10' and cam 130 are then moved endwise on the shaft until the cam 130 engages the cam 120. Thereupon a retaining member 7 (Fig. 33) having a plurality of internally formed splines or teeth 8 engageable with complementary teeth 8a on the shaft 2 is slid onto the shaft. This member 7 is provided with a plurality of radial slots 8b in which eccentrics 9 are received. Cap screws 9a extend through openings in these eccentrics and are received by the hub portion of the rotor 10'. Thus, the slots, eccentrics and cap screws are effective in properly positioning the rotor relative to the member 7 and the shaft 2, it being evident that the teeth 8 and 8' prevent rotation of the member 7 on the shaft. However, the cap screws 9ᵃ can be loosened to permit slight turning of the eccentrics, thereby permitting slight angular adjustment of the same relative to the member 7 and the shaft 2. Accordingly, this arrangement permits some variation in the angular positioning of the rotor 10' and its vanes 12' relative to the shaft 2. Thus the relative angular position of the vanes 12 and 12' may be adjusted, if desired, to vary the timing of the operating cycle of the motor. Obviously, as shown in Fig. 5, a retainer member 18 may be threaded onto the shaft 2 at the end of the member 7 to hold the same in position.

*Valve and ignition chamber assembly*

Each ignition chamber I is in the form of a block of metal, which preferably has a relatively low coefficient of thermal expansion. The block has a bore 100, the end of which may be threaded to receive a spark plug 101 (Fig. 5). Suitable valve mechanism is arranged to permit the movement of the compressed charge from the annular chamber of the compression portion C of the stator into the ignition chamber I and from the latter into the expansion portion E of the stator. The valves preferably may be flat slide valves 110 and 111 in the form of thin plates, the slide valve 110 providing an inlet for the ignition chamber I and the valve 111 providing an outlet for the same.

Figure 22:
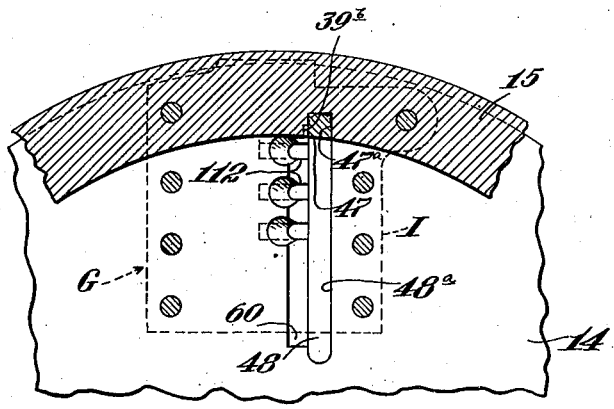
Fig. 22 is an elevational detail of a portion of a part of the inner plate of one of the stator portions, a part being shown in section.

To permit the movement of the charge into the chamber I, the inner wall 14 of the compression chamber C preferably is provided with a plurality of ports 112, the outer ends of these ports being formed in and adjoining the inclined surface of the recessed portion 60 of the plate 14; see Figs. 20 and 22. The ignition chamber I is provided with ports 112ᵃ which are aligned with the ports 112. Suitable mechanism, which will be described, is arranged to actuate the valve 110 so that openings 110ᵃ therein register with the ports 112 and 112ᵃ (Fig. 5) when the charge is being compressed between an abutment A and a vane 12. Preferably, however, the openings 110ᵃ in the valve 110 may be somewhat larger than the ports in the adjoining walls of the stator assembly. Such an arrangement is advantageous in permitting the valve to be open during a greater portion of its path. Furthermore, a corresponding arrangement is especially desirable on the exhaust side of the ignition chamber, since the edges of the metal surrounding the openings in the fully opened valve 111 are disposed in reentrant parts of the assembly and thus are not so liable to deteriorate when the hot gases rush out through this opened valve.

After the valve 110 has closed, the valve 111 may remain closed for an instant while the charge in the ignition chamber I is ignited by the spark plug 101. Thereupon the valve 111 opens, permitting the outflow of the ignited charge through the ports 114 and 114ᵃ in the ignition chamber I and in the inner wall 14' of the expansion chamber E.

It is to be understood that the arrangement of the parts of the expansion chamber E is generally similar to that of the compression chamber and that the parts of these chambers are similarly designated, the chamber E having wall members 14' and 16', for example, corresponding to walls 14 and 16 of chamber C. However, the beveled surfaces of the vanes 12' in this chamber and of the abutments A' are arranged oppositely to the corresponding surfaces in the compression chamber C; Fig. 20 shows this opposite relationship of these surfaces. When the burning charge is received in the space between an abutment A' and a vane 12' in the expansion chamber, the vane is forced away from the abutment and accordingly torque is imparted to the shaft 2.

Referring to Fig. 20, it will be evident that the ports 112 and 112ᵃ are arranged to afford passages which are substantially tangentially disposed relative to the ignition chamber 100 so that the gases may tend to receive a rotary movement as they rush into this chamber, thereby aiding turbulence and proper combustion. At the outlet side of the chamber the passages 114 may be similarly arranged, but due to the opposite disposition of the beveled surfaces of the abutment A' and of the vane 11' the ports 114ᵃ preferably extend directly across the inner wall member 14' of the expansion chamber E, having, however, diagonally disposed extremities which communicate with recesses 114ᶜ that are formed in the inner surface of the vanes 12' and that communicate with each of the passages 114ᵃ. Accordingly, when the cooperating surfaces of the abutment and vane are still in close juxtaposition, gas can flow into the space between these cooperating surfaces through the recesses 114ᶜ.

Figure 23:
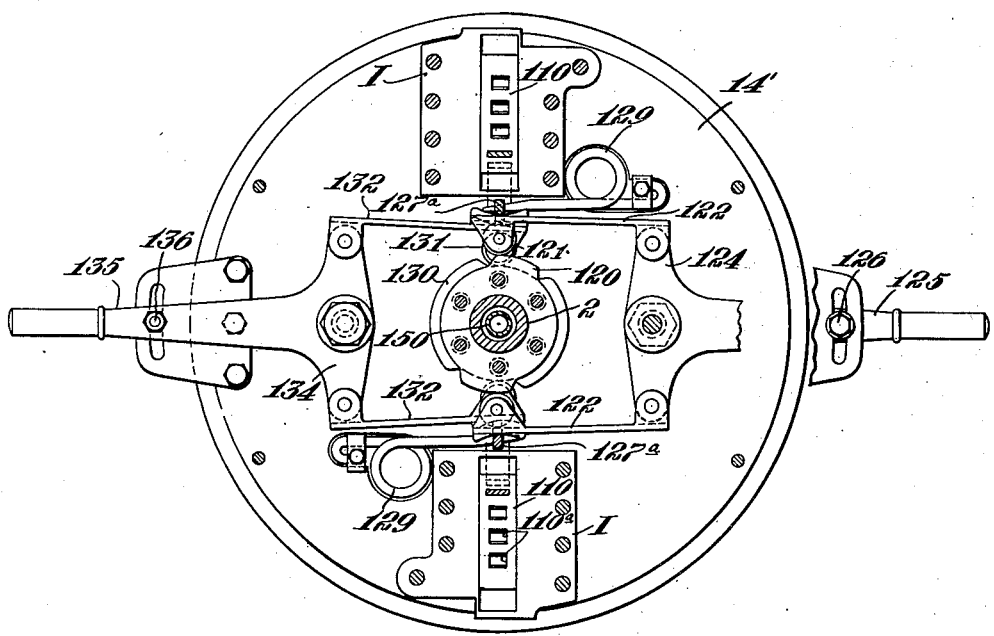
Fig. 23 is an elevational view of such a plate and the associated ignition chambers, showing the arrangement of the valve-actuating and controlling assembly.
Figure 31:
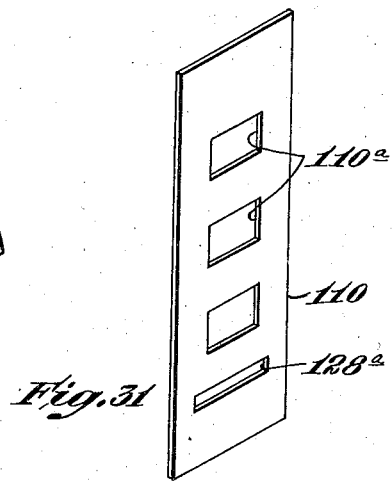
Fig. 31 is an isometric view of a valve.
Figure 32:
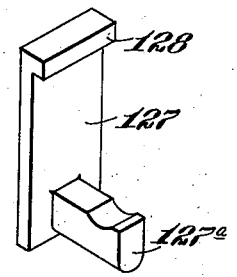
Fig. 32 is an isometric view of an actuator for the same.
Figure 37:
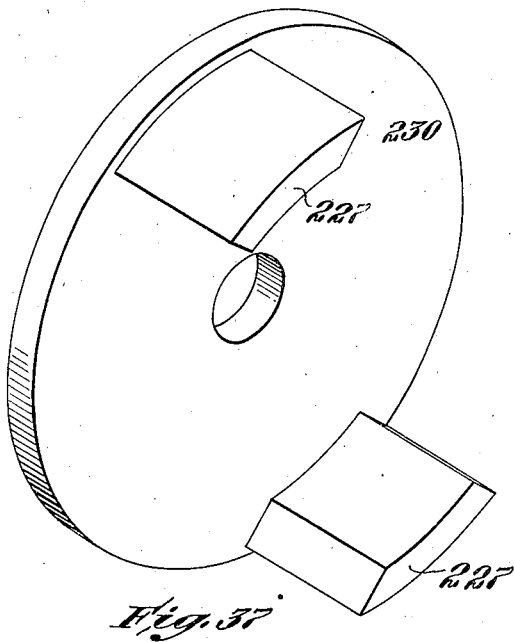
Fig. 37 is an isometric view of the rotor member employed in the compressor shown in Fig. 35.

Referring now in greater detail to the valve-actuating mechanism (Figs. 5 and 23), it is to be understood that cams 120 and 130 are fixed to the intermediate part of the shaft 2 and engage follower rolls 121 and 131 which are rotatably mounted on rocker members 122 and 132, respectively. The outer ends of these rocker members may be pivotally connected to the ends of arms 124 and 134 on adjusting levers 125 and 135. Suitable clamping screws 126 and 136 hold these adjusting levers in position so that during normal operation of the mechanism the rocker members 122 and 132 swing about fixed pivots. Actuators 127 have extensions 127ᵃ (Fig. 32) engageable by the rockers 122 and 132 respectively and have projections 128 received in slots on the inner ends of valves 110 and 111, respectively. Fig. 31 shows such a slot 128ᵃ in the valve 110. Accordingly when, for example, the cam 120 engages a roller 121, the rocker 122 swings about its pivotal connection with the arm 124 of lever 125 and is effective in pushing the actuating member 127 outwardly to actuate the valve 110.

Figure 30:
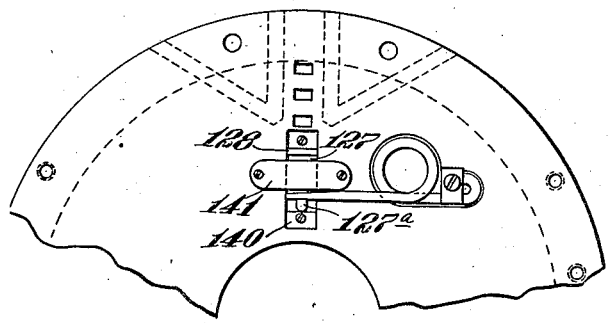
Fig. 30 is an elevational view of the wall of the compression chamber, showing certain parts of the valve guiding and controlling assembly, the valve being removed in this view.

Springs 129 and 139 are secured to the wall members 14 and 14' which are suitably recessed for this purpose; these springs have portions engaging the extensions 127ᵃ of actuators 127, thus tending to press the actuators inwardly and urge the follower rolls 121 and 131 against the corresponding cam surfaces, these springs thus being effective in returning the valves to their normal closed positions after actuations by the respective cams. Wear-resistant plates 140 and 140' are secured in recesses in walls 14 and 14' to engage the actuators 127 (Figs. 5 and 30), while metal spacing strips 141 and 141' extend transversely across these recesses between the upper parts of the actuators and the lower parts of the slide valves. The material of the ignition chambers I is cut away to afford shallow grooves in which the slide valves reciprocate.

The clamping screws 126 and 136 may be loosened to permit the swinging of levers 125 and 135, thus allowing adjustment of the valve timing. It is of course evident that the handles provided by the ends of these levers are readily accessible between the chambers C and E.

Cooling

As shown in Fig. 1, pipe P is arranged to supply coolant for circulation through the rotor and stator. For this purpose suitable piping may extend into registry with ports in the shaft 2, which is hollow. As shown in Fig. 5, a supply duct 150 is arranged within the hollow portion of the shaft and has branches to supply the coolant to the hollow hub portion 11 of the rotor 10, the connections for the latter not being shown in Fig. 5. The vanes 12 are provided with internal baffles 152 (Fig. 6) to cause the circulation of the coolant to the tips of the vanes and the return movement of the liquid through the passages 154 which communicate with a chamber 156 that in turn communicates through passages 154' with the hub 11' of the rotor at the expansion side of the apparatus. Coolant flows from this rotor into the annular chamber about the duct 150 and the chamber 156, this annular space acting as an outlet duct for heated water passing from the rotor and supplying this water to the outlet pipe 159.

Suitable piping also supplies liquid coolant to a fitting 160 (Fig. 20), communicating with openings 164 and 165 (Fig. 12) drilled in the plate 20 of the inner guide 19 for each abutment. These openings are connected to suitable intercommunicating passages in this guide, as shown in full and dotted lines in Figs. 13 and 14, so that the liquid may circulate through the various passages thus provided and out of the opening 165 and back to the water return duct 159. Pipe connections 170 and 171 are provided for the jacket member 23 which has passages registering with corresponding passages in the member 22, so that coolant is circulated through the outer abutment guide.

Suitable junction chambers 158 are provided with tubes connected to various passages in the stator S (Fig. 1) while connections 157 are provided to facilitate the flow of water through the walls of the combustion chambers I.

It will be understood that the side walls 14 and 16 as well as the peripheral ring 15 may also be provided with suitable passages for coolant, if desired, or that these parts may be provided with cooling fins, if preferred. Similar arrangements may also be employed for the parts 14', 16' and 15' of the expansion chamber E.

Sealing means

Suitable sealing means may be provided for both the abutments and the vane members. Referring to Fig. 15, it will be noted that suitable grooves 175 and 176 are provided in the inner walls of the abutment guide 22, a similar groove being provided on the upper inner surface of this guide. Suitable spring-pressed sealing strips 182 (Fig. 5) are mounted in these grooves thus to afford an effective seal for the three planar walls of the abutment which slide in the guide. These sealing arrangements may be of the same general type as are employed on the vane assembly and which are shown more particularly in Figs. 8, 9 and 11. Thus each of these sealing arrangements may include a spring member 188 disposed in a groove and distorted to press the corresponding strip outwardly. Such a spring member may be formed of resilient metal ribbon shaped and tempered to provide adjoining oppositely inclined sections 190 which are disposed at obtuse angles relative to each other (Fig. 11).

The rotor member 10 is provided with circular sealing members 192 which are urged outwardly by curved spring members 193 similar to the straight member 188 shown in Fig. 11. Sealing strips 194 are angularly disposed on the sides of the vanes 12. The angular arrangement of the strips 194 permits them to move past the openings through which the abutments move without catching on the edges of the metal. The sealing strips 196 on the ends of the vanes 12 may also be angularly disposed readily to move past the rabbeted portions 47ᵃ of the peripheral ring 15 (Fig. 22).

Referring to Figs. 5 and 18, it will be noted that the abutment A has a flat upper or outer surface so that the corresponding edge of the opening through which the abutment passes in effect subtends an arcuate portion of the inner surface of the ring 15. Accordingly there is a small surface of the wall 16 above the opening through which the abutment A reciprocates, which surface is engaged by the outer tips of sealing strips 194 (Fig. 7), thus preventing their movement outwardly into the openings provided for the abutments. It is obvious that the radial inner ends of these strips engage the surface of the wall member 16 adjoining the surfaces engaged by the circular sealing members 192. Accordingly both ends of the sealing members 194 are effectively held against outward movement and possible catching on the edges of the openings provided for the abutments. Obviously the same general arrangement is also provided on outer wall 16' of the expansion chamber E.

It is evident that the sealing members 192 and 194 engage the side walls 14 and 16 of the annular chamber and that the sealing member 196 engages the inner surface of the peripheral ring 15. Thus the vanes afford effective seals for the compression chamber C, while the three sides of the abutment A, which are sealed in a corresponding manner by the sealing members 182, afford an effective seal to prevent the leakage of gas past the abutment A, i. e., the leakage from the pocket between the approaching vane 12 and the abutment A (Fig. 20).

Lubrication

The moving parts of a motor of this type may be lubricated in any suitable manner. Preferably the lower part of each casing 1 contains a pool of lubricant through which a portion of the cam 73 may pass, thus causing lubrication of the cam, cam followers, rods 41, etc., by splash. A certain amount of suitable lubricant can also be included with the fuel employed in the motor. Also, if desired, suitable lubricating passages and ducts may be arranged to supply lubricant under pressure to various contacting surfaces. Preferably, as shown in Fig. 5, the shaft 2 is supported on bearings 91 and 91' of porous self-lubricating metal, these bearings being mounted in hollow bosses 93 and 93' on the side walls 16 and 16' of the compression and expansion chambers. The bosses 93 and 93' preferably are provided with oil-receiving ducts 94 and 94' which may supply lubricant to oil-containing chambers 95 and 95' behind the bearings 91 and 91', respectively, so that oil supplied to these chambers may gradually seep through the porous material of the self-lubricating bearings and accordingly afford continuous and adequate lubrication for the same. A thrust collar 96 of porous, self-lubricating metal may be associated with oil duct 97, as shown, and may engage the outer faces of rotor 10.

Operating cycle

Figs. 26 to 29 are diagrammatic views illustrating the operating cycle of the mechanism, the parts being shown for convenience of illustration as if the vanes followed straight-line paths rather than annular paths.

Referring to Fig. 26, the vanes 12 at diametrically opposed sides of the compression chamber C are approaching the abutments A which are in sealing position but which are moving away from their innermost positions. As each abutment A is accelerating away from its innermost position, the beveled surface thereof is in juxtaposed parallel relation to the cooperating beveled surface of the adjoining vane 12, so that the pocket between these cooperating surfaces is allowed to approach a minimum volume and the gases are being squeezed out of the pocket by the oncoming vane through the open valve 110 into the ignition chamber I. As this occurs, the fresh incoming charges from the carburetor and inlet pipes M pass through ports 36 in the ring 15 of the compression chamber. These charges are sucked in by each vane 12 as it moves away from one of these ports. Thus, in the position of the parts shown in Fig. 26, the suction portion of the cycle has been substantially completed.

On the expansion side of the apparatus during this portion of the cycle the abutments A' are moving inwardly, while the vanes 12' are moving past the abutments and the valves 111 are closed. The vanes 12' during this part of the cycle are forcing burnt gases out of the outlet ports 36'.

Now referring to Fig. 27, as each abutment A leaves its sealing position, i. e., moves away from the inner wall of the compression chamber, its speed increases rapidly, the compressed gases having tended to aid initial acceleration of the abutment before it leaves its sealing position. Thus when the parts have reached the position shown in Fig. 27, the valves 110 have closed, while the valves 111 remain closed, the spark plug 101 being energized at this part of the cycle so that initial ignition of the charge takes place in the chamber I. At this portion of the cycle the abutments A' are just moving into sealing position and the cooperating beveled surfaces of the vanes 12' are in generally parallel relation thereto, while these vanes 12' continue to move toward the ports 36' to expel the burnt charges from the expansion chamber E.

When the parts are in the position diagrammatically indicated in Fig. 28, the abutments A have moved back to their innermost positions after permitting the passage of the vanes 12, and the latter are moving away from the inlet ports 36 so that another suction stroke has started. In the meantime, the charges previously drawn into the compression chamber are being compressed between the vanes 12 and the abutments A. On the expansion side of the apparatus, the abutments A' remain in their innermost positions, while the vanes 12' are moving away therefrom during the power stroke and are continuing to be effective in pushing the burnt gases out of the ports 36'.

Figure 29:
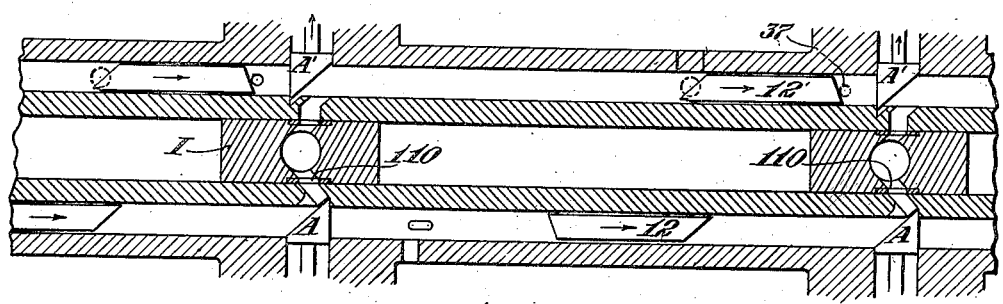

Now referring to Fig. 29, it will be evident that the abutments A continue to remain in their innermost positions, that the vanes 12 are approaching closer to these abutments, that the valves 110 have opened, while the valves 111 are still slightly open. Thus, during this portion of the cycle a fresh charge is starting to move into the ignition chamber I to replace the burnt gases therein, the latter being forced outwardly through the outlet ports into the expansion chamber from which they may pass to the outlet 36'. Thus a limited scavenging effect is afforded during this portion of the cycle so that the burned gases are forced out of the ignition chamber I, but so that little or none of the fresh charge has time to pass through the outlet valve 111 into the expansion chamber. In order to avoid unnecessary compression of pocketed gas between an advancing vane 12' and an abutment A', scavenging ports 37 are provided in the ring 15' (Figs. 3 and 29).

During this part of the cycle it is evident that the vanes 12' have just passed the outlet ports 36' and that they are approaching the abutments A' which have started to move toward their outermost positions. After the vanes 12' have passed the abutments A', the latter start to move inwardly again while compression of the gases between the vanes 12 and the abutments A continues until the parts again reach the position illustrated in Fig. 26, whereupon the cycle is repeated.

Referring now in greater detail to certain critical portions of the cycle, Fig. 21 illustrates the relationship of the abutment A' and vane 12', when the gas-containing pocket has a volume of minimum capacity. Thus, Fig. 21 shows in dot and dash lines the position of an abutment A' and a vane 12' just after the abutment reaches its sealing position and just before the valve 111 starts opening. It will be understood that the arrangement of the recess 60 and the beveled shaping of the abutment and the vane permit the cooperating beveled surfaces of these parts to be in closely parallel relation as the abutment thus approaches its sealing position.

During this part of the movement of the abutment, it is decelerating but it is still moving, however, at a relatively high speed so that the space between the cooperating beveled surfaces of the abutment and vane may remain substantially constant for a small portion of the cycle after the abutment reaches sealing position. As this occurs, the burning gases start to flow into the space between these cooperating surfaces, and by the time the abutment has reached its innermost position, shown in full lines in Fig. 21, the cooperating surface of the vane has moved away somewhat, but the spacing of these surfaces is still relatively close. Accordingly the burning of the gases which started in the ignition chamber I can continue without substantial expansion of these gases until combustion has been substantially completed. In this connection it may be noted that during this part of the cycle the volume of the space between the abutment A' and the vane 12' is but a small fraction of the volume of the combustion chamber I. Thus combustion takes place under conditions of substantially constant volume as is the case in the conventional reciprocating engine. Thereafter the abutment remains in its innermost position for a substantial fraction of the cycle while the vane is moving rapidly away therefrom. As expansion then takes place rapidly under these conditions, heat losses to the walls of the combustion chamber are minimized. Thus the power portion of the cycle occurs under more favorable conditions than exist in the conventional reciprocating engine, wherein the piston is still but a short distance from its dead center position when the maximum gaseous pressure is attained.

Referring to the lower part of Fig. 20, the vane 12 and abutment A are shown by full lines just at the time that the abutment A is leaving its innermost position, there being a narrow space between the beveled surfaces of the parts so that the quantity of the compressed charge which is not pressed into the ignition chamber I may be relatively small. As the movement of the vane continues, the abutment moves out of its path. It is evident that in this portion of the cycle there may be a period of minimum volume for a definite, small interval. The arrangement of the ports 112, 112a, and 114 and 114a permits the amount of gases which occupy these parts of the apparatus to be relatively small during the operating cycle, thereby enhancing efficiency.

It will be evident that when the abutment A' approaches its innermost position, i. e., is substantially in the position diagrammatically indicated in Fig. 21, the compressed and burning gases which contact the beveled surface of the abutment aid materially in decelerating the abutment so that it can move rapidly through a major portion of its path and yet decelerate quickly when it reaches its sealing position.

In regard to minimum volume for the compression and expansion chambers, by proper adjustment of valves and of the camming mechanism, such a minimum volume may become that produced by proximity of abutment and vane just short of actual contact. The reduction in volume becomes progressively slower until the minimum volume is reached, then the volume begins to increase and proceeds at a progressively faster rate. Near the instant of minimum volume, both before and after this instant, there is a range of volume changes which are inconsequential; such a substantially constant volume as to allow efficient passage of gas into the explosion chamber and to allow efficient combustion of gases in the expansion chamber. Hence, the compression or expansion chamber provides during the range of substantially constant volume a restricted pocket. Yet, up to the instant of minimum volume, a squeezing process may be considered as continuing.

While for purposes of illustration I have shown an engine provided with two ignition chambers I and with corresponding pairs of abutments A and A', it will be understood that the number of abutments and ignition chambers can be varied as desired, these parts, however, preferably being equidistantly spaced about the stator. Similarly the number of vanes on the vane members 10 and 10' may similarly be varied; for example, there might be three vanes on each of these members in a motor having but two ignition chambers and two pairs of abutment assemblies. I prefer, however, to arrange the vanes so that they occupy but a minor fraction of the volumes of the corresponding annular chambers.

While I have shown the abutments arranged to follow paths which are substantially perpendicular to the planes of vane movement, it will be understood that the exact relationship of these respective paths may be varied, certain variations thereof being illustrated in connection with optional forms of the invention disclosed herein.

*Auxiliary compression arrangement*

Fig. 34 illustrates apparatus similar to that shown in Fig. 5, similar parts being similarly designated. With this embodiment of the invention, however, spaced cams 120a and 130a are substituted for the cams 120 and 130 and in the space therebetween a third cam 199 is provided to actuate a small piston 200 which reciprocates in the cylindrical bore 100 of ignition chamber I, a compression spring 201 holding the cam follower 202 against the third cam. The cam 199 may actuate the piston 200 substantially at the instant of ignition so that the effective volume of the chamber may be decreased as the gases pass into the space between the abutment A' and the vane 12'; accordingly, under these conditions, the increase in volume due to the outflow of gases in this manner is substantially compensated for by the contraction in the volume in the ignition chamber itself.

It is furthermore evident that this arrangement may be so constructed and timed that additional compression of the gases will occur before ignition. Thus, such an arrangement may be employed advantageously with a Diesel cycle, a conventional fuel injector assembly being substituted for the spark plug 101 for this purpose, and the carburetor being omitted.

*Optional abutment arrangements*

It is to be understood that the principles of this invention may be employed in pumps as well as in motors and that the physical relationship of the moving parts may be considerably varied to suit individual conditions. Figs. 35, 36, 36a and 37 show a compressor assembly provided with radially movable abutments, it being understood that a similar arrangement may be employed in a motor. Thus the abutment A² may have a beveled advanced surface 220 and may be mounted at the forked end of a rocker arm 221. The opposite end of this rocker arm carries a roll 222 engageable with a cam disk 223 and a second roll 224 engageable with an internal cam on a disk 225. The cams 223 and 225 cooperate in effect in defining a track for the rolls so that the rocker arm and abutment A² are positively actuated both during their inward and outward movements.

The vane member 230 (Fig. 37) may comprise a disk which affords one wall of an annular chamber in which the generally arcuate or sector-like vanes 227 are rotatable. Each vane 227 has an advanced edge which is beveled, as designated by numeral 228, substantially to correspond to the beveled advanced end 220 of the abutment A². When the vane 227 is substantially spaced from the abutment A², a suitable inlet port corresponding to the port 36 of Fig. 20 may be uncovered so that a gaseous charge, as for example a charge of air, is received in the arcuate pocket between the abutment and the advancing vane. Thereupon as the vane passes the port and approaches the abutment the gas is compressed between these parts until the pressure is sufficient to open a suitable check valve 231 through which the compressed gas may pass to a suitable tank. Obviously as soon as the vane approaches the position shown in Fig. 35, the abutment moves out of its path. It is evident that the outer wall 234 of the stator is recessed, as designated by numeral 235, so that the operation of the abutment may be similar to that described with reference to the recess 60 of Figs. 20 and 22. Obviously after the vane 227 has moved past the abutment, the cam 225 returns the latter to the position shown in Fig. 35. As shown in Fig. 36a, the abutment preferably has a flange 233 slidable in a groove in the wall of the stator which is remote from the disk-like portion of the vane member 227.

Obviously the arrangement shown in Fig. 35 provides a general relationship of abutment and vane member similar to that described in connection with Fig. 20 of the invention, since in each instance the abutment may have a stroke longer than the width of the annular chamber through which it passes, so that it can start its inward motion before the vane has cleared the abutment path. Furthermore, in each instance the abutment has a beveled surface cooperating with a similar surface of the vane and the vane is so arranged that the path followed by the abutment may be relatively short. Thus in each of these embodiments of the invention the cooperating surfaces of the vane and abutment may be closely juxtaposed.

While for convenience of illustration the surfaces of the vanes and abutment have been shown as generally parallel to each other when these parts are in their closest juxtaposition, it is to be understood that some deviation from this relationship can obviously be provided while still permitting the major advantages of this general relationship to be attained. Thus, for example, the cooperating surfaces of the abutment and vane might have slightly curved surfaces or surfaces which diverged or converged slightly when the parts were in closest juxtaposition.

Figure 38:
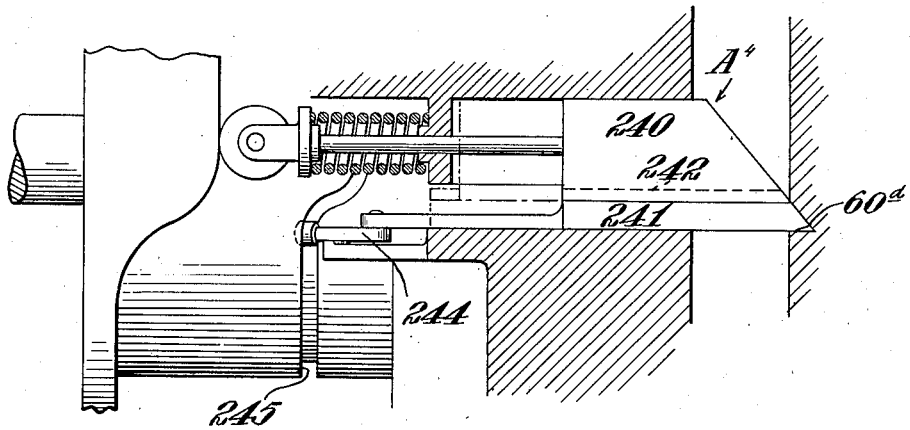

Fig. 38 shows an abutment A⁴ having a body portion 240 generally similar to the abutment A, but this body portion of the abutment is provided with actuating means which does not cause the part 240 to extend clear across the annular chamber and into a recess in the opposite wall. A separate relatively light blade 241 is provided for this purpose, having a dovetailed sliding connection 242 with the member 240. Separate actuating means comprising rocker arm 244 and cam groove 245 are adapted to cause the movement of the plate 241. The path of the plate 241 is longer than that of the member 240 which serves to reinforce and support the plate. The plate, however, may be relatively light so that its acceleration and deceleration may be more readily effected.

It is evident that the plate 241 has a beveled edge portion engageable in a recess 60ᵈ corresponding to the recess 60 of Fig. 22. An arrangement of this character permits the more rapid acceleration of the abutment into and out of sealing position; the total inertia forces due to the movement of a two-part abutment of this character being less than when a single abutment is moved for as long a distance as the plate 241 is moved in the construction illustrated in Fig. 38.

Fig. 39 illustrates another optional abutment arrangement wherein the vane member 249 may be of the general form illustrated in Fig. 6, but may be provided with an edge having mutually inclined surfaces 250 and 251. With this type of vane, similar cooperating abutments 253 and 254 may be employed, these abutments respectively having beveled surfaces 255 and 256 which cooperate respectively with the beveled surfaces 250 and 251 of the vane.

Any suitable cam means, such as the cams 260, may be arranged to be driven by auxiliary shafting to actuate the abutments 253 and 254 which may be provided with retracting springs 261. In order to provide an overlap during which the abutments may be decelerating while in sealing position, the end of the abutment 254 may be provided with a groove engaging a tongue 259 of the abutment 253, the tongue fitting within the groove before the abutments reach their innermost positions. Obviously with this arrangement the sealing of the abutments takes place before they reach their innermost positions and while their beveled surfaces are in generally parallel relation to the corresponding surfaces of the vane.

Figs. 40 and 41 illustrate an optional sealing arrangement for an abutment such as the abutment A. With this arrangement each wall of the jacket assembly which engages a planar surface of the abutment may be provided with a metal sealing strip 270 behind which is a hollow, thin-walled metal chamber 271. Thus, as shown in Fig. 41, there may be three intercommunicating chambers 271 supporting three sealing strips 270 to engage the three planar surfaces of the abutment. The chambers 271, being thin walled, are slightly distensible under pressure and form part of a suitable hydraulic system including a connecting duct 274 and an expansible-contractible bellows 275 which is provided with a cam roller 276 engageable with a cam 277 which may be driven by the main shaft of the machine. When the abutment is moving inwardly toward its closed position, the chambers 271 may be contracted so that the strips 270 but lightly engage the corresponding surfaces of the moving abutment. However, when the abutment reaches its sealing position, the cam 277 is effective in compressing the bellows 275 and in causing the expansion or distention of the chambers 271 so that the strips 270 are pressed inwardly into firm sealing engagement with the cooperating surfaces of the abutment, thus affording a firm seal during this part of the cycle and also aiding the deceleration of the abutment. Obviously, when the abutment leaves its innermost position, the cam 277 permits the bellows 275 to expand, drawing oil out of the chambers 271 so that the pressure of the strips 270 upon the abutment is again relaxed.

It should be understood that the present disclosure is for the purpose of illustration only and that this invention includes all modifications and equivalents which fall within the scope of the appended claims.

I claim:

1. Fluid pressure apparatus of the class described comprising two relatively rotatable assemblies, one of said assemblies comprising a vane moving within an annular chamber which includes a wall portion provided by the second assembly, an abutment support fixedly connected to said wall portion, an abutment movable on said support to an extreme position wherein it forms a wall in said annular chamber and acts to seal a pocket in said chamber between itself and the vane and thereafter being movable away from said extreme position and out of the chamber to let the vane pass the opening, said abutment having a surface in said chamber against which gaseous pressure acts to urge the abutment away from its extreme position while the abutment is near this position and is acting to provide a seal for said pocket but is in motion, said apparatus providing inlet and outlet ports for said pocket.

2. Fluid pressure apparatus of the class described comprising two relatively rotatable assemblies, one of said assemblies comprising a vane moving within an annular chamber which includes a wall portion provided by the second assembly, an abutment support fixedly connected to said wall portion, an abutment movable on said support to an extreme position wherein it forms a wall in said annular chamber and acts to seal a pocket in said chamber, and thereafter being movable away from said extreme position and out of the passage to let the vane pass the opening, said abutment having a surface in said chamber against which gaseous pressure acts to urge the abutment away from its extreme position, the apparatus providing structure directly to engage and slidably to support the advance end of the abutment as it approaches its extreme position, thereby being effective in supporting the abutment against the pressure of gas pocketed between the vane and abutment, the apparatus providing inlet and outlet ports through which gas may pass into and out of the pocket between the abutment and vane.

3. Fluid pressure apparatus comprising a rotor member and a stator member, said members cooperating to afford an annular chamber, one of said members including a vane disposed in said chamber, the other of said members including an abutment support, an abutment movable on said support into said chamber and to an extreme position wherein it is effective in sealing a pocket in the chamber, the last-named member affording a recess which receives the advance end of the abutment as the latter approaches its extreme position, said recess affording a sealing surface that engages a cooperating surface of the abutment, the vane and abutment having surfaces each of which have a general inclination relative to radial planes extending from the axis of the rotor and intersecting said surface, said surfaces being in generally parallel juxtaposition as the abutment is in motion near its extreme position and is sealing said pocket, whereby the pocket may then be restricted in capacity, the apparatus providing a port communicating with said chamber at a point between the vane and the abutment, while the vane and abutment are in said juxtaposition and a second port connecting with said chamber when the vane and the abutment are in relative position such that said inclined surfaces are away from said juxtaposition by a distance sufficient for an effective compression or expansion stroke.

4. Apparatus of the class described comprising a rotor including a hub portion and a vane projecting therefrom, a stator cooperating with the hub portion to define an annular chamber in which the vane rotates with its surfaces in engagement with the surfaces of said stator which define said chamber, said stator providing side walls, an abutment guide secured to one of said side walls, said wall having an opening therein, an abutment slidably mounted on said guide and movable through said opening to a fluid sealing position wherein the abutment cooperates with the vane in defining a fluid containing pocket within said chamber, the side wall of the stator opposite the abutment guide providing a recess to receive the advance end of the abutment in sealing engagement with a surface thereof when the abutment extends across the chamber, and means including a cam movable with the rotor to move the abutment back and forth across the chamber, said means and the abutment being arranged so that the initial movement of the abutment toward its sealing position may occur before the advance end of the abutment moves into the chamber and so that final deceleration of the abutment during sealing position as it approaches its extreme sealing position may occur while the advance end of the abutment engages said surface of the recess and while a portion of the vane lies within the path of the abutment.

5. Fluid pressure apparatus comprising a rotor member and a stator member, said members cooperating to afford an annular chamber, one of said members including a vane disposed in said chamber, the other of said members including an abutment support, an abutment movable on said support into said chamber and to an extreme position wherein it is effective in sealing a pocket in the chamber, the last-named member affording a recess which receives the end of the abutment as the latter approaches its extreme position, said recess affording a sealing surface that engages a cooperating surface of the abutment as the latter approaches its extreme position, the vane and abutment having surfaces each of which have a general inclination relative to intersecting radial planes extending from the axis of the rotor, said surfaces being in generally parallel juxtaposition as the abutment is in motion near its extreme position and is sealing said pocket, whereby the pocket may then be restricted in capacity, the apparatus providing a port communicating with said chamber at a point between the vane and the abutment while the vane and the abutment are in said juxtaposition, and a second port communicating with said chamber when the vane and the abutment are in relative position such that said inclined surfaces are away from said juxtaposition by a distance sufficient for an effective compression or expansion stroke, and means for positively moving said abutment into juxtaposition to the vane.

6. Fluid pressure apparatus comprising a rotor member and a stator member, said members cooperating to afford an annular chamber, one of said members including a vane disposed in said chamber, the other of said members including an abutment support, an abutment movable on said support into said chamber and to an extreme position wherein it is effective in sealing a pocket in the chamber, the last-named member affording a recess which receives the end of the abutment as the latter approaches its extreme position, said recess affording a sealing surface that engages a cooperating surface of the abutment as the latter approaches its extreme position, the vane and abutment having surfaces each of which has a general inclination relative to intersecting radial planes extending from the axis of the rotor, said surfaces being in generally parallel juxtaposition as the abutment is in motion near its extreme position and is sealing said pocket, whereby the pocket may then be restricted in capacity, the apparatus providing a port communicating with said chamber at a point between the vane and the abutment while the vane and the abutment are in said juxtaposition, and a second port communicating with said chamber when the vane and the abutment are in relative position such that said inclined surfaces are away from said juxtaposition by a distance sufficient for an effective compression or expansion stroke, and mechanism for controlling the movement of the abutment comprising a cam operative in response to rotation of the rotor to cause the abutment to move toward its extreme position, and a spring tending to move the abutment away from said position.

7. Fluid pressure apparatus comprising a rotor member and a stator member, said members cooperating to afford an annular chamber, one of said members including a vane disposed in said chamber, the other of said members including an abutment support, an abutment movable on said support into said chamber and to an extreme position wherein it is effective in sealing a pocket in the chamber, the last-named member affording a recess which receives the end of the abutment as the latter approaches its extreme position, said recess affording a sealing surface that engages the abutment as the latter approaches its extreme position, the vane and abutment having surfaces each of which have a general inclination relative to intersecting radial planes extending from the axis of the rotor, said surfaces being in generally parallel juxtaposition as the abutment is in motion near its extreme position and is sealing said pocket, whereby the pocket may then be restricted in capacity, the apparatus providing a port communicating with said chamber at a point between the vane and the abutment while the vane and the abutment are in said juxtaposition, and a second port communicating with said chamber when the vane and the abutment are in relative position such that said inclined surfaces are away from said juxtaposition by a distance sufficient for an effective compression or expansion stroke.

8. Internal combustion engine of the class described comprising a rotor member and a stator member cooperating to provide two annular chambers, one of said members providing a vane movable in each of said chambers, the other of said members providing an abutment support for each of said chambers, an abutment movable on each support into an extreme position wherein it seals a pocket in the corresponding chamber between itself and the vane, said abutments and vanes being shaped and arranged so that said pockets are restricted when the abutments are moving near their extreme positions, a combustion chamber between said annular chambers, an inlet valve operable to admit a compressed charge from the restricted pocket in one of the annular chambers to the combustion chamber, an outlet valve to emit a charge from the combustion chamber to the restricted pocket in the other annular chamber, an inlet port communicating with the pocket in the first chamber when the latter is relatively large in volume, and an exhaust port communicating with the pocket in the other chamber when that pocket is relatively large, and means for operating said valves so that said inlet valve starts opening while the outlet valve is open and the exhaust port communicates with the last-named pocket, thereby to permit scavenging of the combustion chamber.

9. Internal combustion engine of the class described comprising a rotor member and a stator member cooperating to provide two annular chambers, one of said members providing a vane movable in each of said chambers, the other of said members providing an abutment support for each of said chambers, an abutment movable on each support into an extreme position wherein it seals a pocket in the corresponding chamber between itself and the vane, said abutments and vanes being shaped and arranged so that said pockets are restricted when the abutments are moving near their extreme positions, a combustion chamber between said annular chambers, an inlet valve operable to admit a compressed charge from the restricted pocket in one of the annular chambers to the combustion chamber, an outlet valve to emit a charge from the combustion chamber to the restricted pocket in the other annular chamber, an inlet port communicating with the pocket in the first chamber when the latter is relatively large in volume, and an exhaust port communicating with the pocket in the other chamber when that pocket is relatively large, said valves being slide valves having a plurality of openings therein which move into registration with corresponding ports in one of said members when the valve is opened.

10. Internal combustion engine of the class described comprising a rotor member and a stator member cooperating to provide two annular chambers, one of said members providing a vane movable in each of said chambers, the other of said members providing an abutment support for each of said chambers, an abutment movable on each support into an extreme position wherein it seals a pocket in the corresponding chamber between itself and the vane, said abutments and vanes being shaped and arranged so that said pockets are restricted when the abutments are moving near their extreme positions, a combustion chamber between said annular chambers, an inlet valve operable to admit a compressed charge from the restricted pocket in one of the annular chambers to the combustion chamber, an outlet valve to emit a charge from the combustion chamber to the restricted pocket in the other annular chamber, an inlet port communicating with the pocket in the first chamber when the latter is relatively large in volume, and an exhaust port communicating with the pocket in the other chamber when that pocket is relatively large, cams carried on the rotor away from its center for operating said valves in response to movement of the rotor, and a manually controllable adjustment device for said means to vary the timing of said valves, said device comprising engaging pieces carried by the stator and adapted to move in arcuate paths corresponding to the paths of said cams, whereby said cams will engage said pieces at a varying predetermined portion of the cam cycles.

11. Fluid pressure apparatus of the class described comprising a rotor member, a stator member, said members cooperating to define an annular chamber, one of said members including a vane movable in said chamber, the other of said members providing an abutment support, an abutment movably mounted on said support, said abutment and said vane having surfaces disposed at a substantial angle to intersecting radial planes of the rotor, and cam means for positively moving the abutment across the annular chamber to cause the inclined surfaces of the abutment and vane to be in close generally parallel proximity, thus providing a restricted pocket therebetween, the apparatus providing a port communicating with said chamber at a point between the vane and the abutment while the vane and the abutment are in said proximity, and a second port communicating with said chamber when the vane and the abutment are in relative position such that said inclined surfaces are away from said proximity by a distance sufficient for an effective compression or expansion stroke.

12. Apparatus of the class described comprising a rotor including a hub portion and a vane, a stator cooperating with said hub portion in enclosing an annular chamber in which the vane rotates, said stator having side walls with surfaces engaging side surfaces of the vane, one of the side walls of the stator having an opening therein, an abutment guide secured to said side wall of the stator, an abutment slidably mounted on said guide and movable through said opening, said abutment and said vane having cooperating inclined surfaces which are disposed at a substantial angle to intersecting radial planes of the rotor, and cam means carried by the rotor and effective to cause the inclined surface of the abutment to move into the annular chamber and into close generally parallel relation with the cooperating inclined surface of the vane.

13. Apparatus of the class described comprising a rotor including a hub portion and a vane, a stator cooperating with said hub portion in enclosing an annular chamber in which the vane rotates, said stator having side walls with surfaces engaging side surfaces of the vane, one of the side walls of the stator having an opening therein, an abutment guide secured to said side wall of the stator, an abutment slidably mounted on said guide and movable through said opening, said abutment and said vane having cooperating inclined surfaces which are disposed at a substantial angle to intersecting radial planes of the rotor, the inner surface of the opposite side wall of said stator having a recess with a surface to receive the advance end of the abutment in fluid sealing engagement therewith, and means to reciprocate the abutment back and forth across the annular passage so that in one portion of its path it may engage said surface of the recess while its inclined surface is in close generally parallel relation to the cooperating surface of the vane.

14. An abutment for apparatus of the class described, comprising parallel planar end walls and a connecting wall therebetween, an inclined wall disposed at an angle to said connecting wall, the end walls having triangular extensions connected to the ends of the inclined wall, the end walls having reinforcing flanges at their edges opposite the connecting wall, said flanges being parallel to the connecting wall.

15. An abutment for apparatus of the class described comprising parallel planar end walls and a connecting wall therebetween, an inclined wall disposed at an angle to said connecting wall, the end walls having triangular extensions connected to the ends of the inclined wall, the end walls having reinforcing flanges at their edges opposite the connecting wall, said flanges being parallel to the connecting wall, one of said flanges extending outwardly of the corresponding wall to slide in a guiding groove, and a plurality of reinforcing flanges for said inclined wall between the extensions of said end wall.

16. Fluid pressure apparatus of the class described comprising a rotor including a disk and a generally arcuate vane member carried by the disk at one side of the plane thereof, a stator cooperating with the rotor in defining a generally annular chamber in which the vane rotates, said stator providing an abutment guide, an abutment movable in a generally radial direction to cooperate with the vane in providing a pocket of varying size in a portion of said chamber, and inlet and outlet ports for communicating with said chamber, said guide being arranged so that said abutment follows a substantially radial path, said abutment and said vane having cooperating beveled surfaces each inclined relative to radial planes intersecting such surfaces, said beveled surfaces being inclined for generally parallel juxta-position.

17. Fluid pressure apparatus of the class described comprising a rotor including a disk and a generally arcuate vane member carried by the disk at one side of the plane thereof, a stator cooperating with the rotor in defining a generally annular chamber in which the vane rotates, said stator providing an abutment guide, an abutment movable in a generally radial direction to cooperate with the vane in providing a pocket of varying size in a portion of said chamber, inlet and outlet ports for communicating with said chamber, and cam means for causing the inward and outward movement of said abutment in a substantially radial direction, said cam means positively determining the various positions and movements of the abutment, said beveled surfaces being inclined for generally parallel juxta-position.

18. Fluid pressure apparatus of the class described comprising a compression portion and an expansion portion, each of said portions being provided with a cooperating vane and abutment with similarly beveled surfaces to provide pockets of relatively small capacity during parts of the operating cycle, a combustion chamber between the compression and expansion portions of the apparatus, valve means for admitting a compressed gaseous charge from the compression portion to said chamber and for emitting a burning charge from said chamber to the expansion portion, and a piston movable in said chamber to decrease the effective volume thereof as gas passes into the expansion portion whereby the volume of the gas may be kept substantially constant as it passes into the expansion portion.

19. In a rotary engine or compressor, a rotary shaft, stators comprising pairs of substantially circular plates defining annular compression chambers and annular motor chambers, cylindrical rotors fixed to said shaft and enclosed within said stator and concentric with said shaft and having a series of separated beveled vanes projecting into said compressor and motor chambers, plurality of abutment chambers fixed to the exterior of and arranged normally to the stator walls, a movable abutment in each abutment chamber, said abutment having an inclined face corresponding in angle to the rotor vane, cams attached to said rotary shaft with lobes thereon for reciprocating said abutments parallel to the shaft and across path of motion of the rotor vanes, said lobes on cams so shaped as to give gradual acceleration of movement to the abutment but at one interval of travel of the cam to maintain the beveled faces of the abutment and the rotor vane at approximately the same vertical distance apart for an appreciable interval of time.

20. In a rotary engine or compressor, a rotary shaft, stators comprising pairs of substantially circular plates held in spaced apart relationship by annular rings defining annular compression chambers and annular combustion chambers, cylindrical rotors fixed to said shaft enclosed within said stators and concentric with said shaft and having a series of separated inclined vanes projecting into said annular chambers, a plurality of abutment chambers fixed to the exterior of and arranged normally to the stator walls, a movable abutment in each abutment chamber, said abutments having inclined faces complementary to the inclined faces of the rotor vanes, said rotor vanes and said rotors having grooves with sealing devices therein, said grooves on the rotor being circular and concentric on the face of the hub portion, angular grooves extending therefrom on the faces of the vanes, said angular grooves being out of coincidence with the direction of grooved recesses in stator walls when the motion of the rotor brings said grooves opposite.

21. Fluid pressure apparatus comprising relatively rotatable members, one of said members having a support portion and a vane carried by said portion, the other of said members being adapted to carry an abutment, said support portion and the abutment-carrying member cooperating to form an annular chamber defined by the path of the vanes, an abutment movable across the chamber, the abutment having a free position in which the abutment is retracted from the path of the vane and a seated position in which the abutment is extended to wall off with the vane a segment of the chamber, there being a conduit in said apparatus connecting with said segment, the apparatus affording a space for said retraction and a recess for extension of the abutment into said seated position, the abutment having one leading face non-parallel to its line of reciprocation, said leading surface being extensible from the edge of said chamber a varying distance, said variation being generally progressive from one side of the abutment to the other when considered along the path of the vane, said recess being adapted to receive the longest extending portion of said leading surface, the vane having surfaces adapted to complement generally said leading face of the abutment, means to actuate said abutment in relation to the vane so that the volume of said segment remains substantially constant during a portion of the path of said vane while the abutment is moving from one depth in said seating recess to another of said depths.

22. Fluid pressure apparatus comprising a rotor member and a stator member, the rotor member having a support portion and a vane carried by said portion, said support portion and the stator cooperating to form a ring-like chamber defined by the path of the vane, an abutment movable across the chamber, the abutment having a free position in which the abutment is retracted from the path of the vane and a seated position in which the abutment is extended to wall off with the vane a segment of the chamber, there being a conduit in said apparatus connecting with said segment, the stator affording a space for said retraction and a recess for extension of the abutment into said seated position, said recess affording a sealing surface for cooperating with a surface of the abutment in sealing the segment while the abutment is moving and a portion of the abutment is in the recess, the abutment and vane having surfaces inclined for generally parallel juxtaposition, said inclined surfaces being so disposed that movement of the abutment and movement of the vane compensate each other in maintaining a substantially constant volume of the segment during movement of the abutment in sealing position.

23. Internal combustion engine of the class described comprising a rotor member and a stator member cooperating to provide two annular chambers, one of said members providing a vane movable in each of said chambers, the other of said members providing an abutment support, an abutment movable on each support into an extreme position wherein it seals a pocket in the corresponding chamber between itself and the vane, said abutments and vanes being shaped to compensate the effect of each others movement upon the volume of said pockets when the abutments are moving near their extreme positions, a combustion chamber between said annular chambers, an inlet valve operable to admit a combustion charge from the pocket during its constant volume phase in one of the annular chambers to the combustion chamber, an outlet valve to emit a charge from the combustion chamber to the other pocket in the other annular chamber during its constant volume phase, the combustion chamber having piston means slidable therein for diminishing its volume, means to move the piston into said volume diminishing position near the instant of ignition.

24. In apparatus of the class described wherein an abutment moves into and out of an annular chamber in which a vane rotates, the combination comprising an abutment guide, an abutment slidable in the guide, a hollow-wall, distensible container carried by the support member near said guiding surfaces, said container being positioned for exerting a sealing force against the abutment surface adjacent said guiding walls, means coordinating with the movement of the abutment to distend said container at the extreme position of the abutment.

25. Fluid pressure apparatus comprising a rotor member and a stator member, the rotor member having a support portion and a vane carried by said portion, said support portion and the stator cooperating to form a ring-like chamber defined by the path of the vane, an abutment movable across the chamber, the abutment having a free position in which the abutment is retracted from the path of the vane and a seated position in which the abutment is extended to wall off with the vane a segment of the chamber, there being a conduit in said apparatus connecting with said segment, the stator affording a space for said retraction and a recess for extension of the abutment into said seated position, said recess affording a sealing surface for cooperating with a surface of the abutment in sealing the segment while the abutment is moving and a portion of the abutment is in the recess, a second abutment supported by the stator adjacent the first mentioned abutment, the second mentioned abutment being movable across the chamber and having a free position and a thwart position, the second mentioned abutment being retracted from the path of the vane in said free position, the second mentioned abutment being extended across the chamber in said thwart position, each of said abutments having a leading surface inclined relatively to their paths of movement, said inclined surfaces fitting together at one of the relative positions of the abutments to form a substantially single inclined surface, the vane having surfaces adapted to complement generally said inclined surfaces of the abutment, means to actuate said abutments in relation to the vane so that the volume of said segment remains substantially constant during a portion of the path of said vane while the first mentioned abutment is moving from one depth in said seating recess to another of said depths.

26. Fluid pressure apparatus comprising a rotor member and a stator member, the rotor member having a support portion and a vane carried by said portion, said support portion and the stator cooperating to form a ring-like chamber defined by the path of the vane, abutments movable across the chamber, said abutments having sealing surfaces at their tips, the abutments having a free position in which the abutment is retracted from the path of the vane and an interfitting position in which the abutments are extended to fit together said sealing surfaces on each abutment and to wall off with the vane a segment of the chamber, the sealing surfaces being adapted to permit a range of interfitting positions up to an extreme position, there being a conduit in said apparatus connecting with said segment, the stator affording a space for said retraction, said abutments having surfaces in the chamber against which gaseous pressure in the chamber acts to urge the abutments away from their extreme position while in interfitting position, the vane having surfaces adapted to complement generally said leading face of the abutments, means to actuate said abutments in relation to the vane so that the volume of said segment remains substantially constant during a portion of the path of said vane while the abutments are moving from one interfitting position to another.

KENNETH H. MacKAY.